US012199367B2

(12) United States Patent
Wang et al.

(10) Patent No.: US 12,199,367 B2
(45) Date of Patent: Jan. 14, 2025

(54) PHASED ARRAY ANTENNA

(71) Applicants: Beijing BOE Sensor Technology Co., Ltd., Beijing (CN); BOE TECHNOLOGY GROUP CO., LTD., Beijing (CN)

(72) Inventors: Yan Wang, Beijing (CN); Haocheng Jia, Beijing (CN); Guodong Feng, Beijing (CN); Di Cao, Beijing (CN); Yan Lu, Beijing (CN); Zhifeng Zhang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/016,038

(22) PCT Filed: Feb. 28, 2022

(86) PCT No.: PCT/CN2022/078461
§ 371 (c)(1),
(2) Date: Jan. 13, 2023

(87) PCT Pub. No.: WO2023/159625
PCT Pub. Date: Aug. 31, 2023

(65) Prior Publication Data

US 2024/0250434 A1 Jul. 25, 2024

(51) Int. Cl.
*H01Q 9/04* (2006.01)
*H01P 1/18* (2006.01)
(Continued)

(52) U.S. Cl.
CPC ............ *H01Q 9/0457* (2013.01); *H01P 1/18* (2013.01); *H01Q 9/0428* (2013.01); *H01Q 21/0068* (2013.01); *H01Q 21/065* (2013.01)

(58) Field of Classification Search
CPC ....... H01P 1/18; H01P 1/182; H01Q 21/0006; H01Q 21/0068; H01Q 21/06;
(Continued)

(56) References Cited

U.S. PATENT DOCUMENTS 6,201,508 B1 * 3/2001 Metzen .................. H01Q 21/00 343/778
9,257,753 B2 * 2/2016 Milroy ................... H01Q 25/02
(Continued)

FOREIGN PATENT DOCUMENTS

CN 105356054 A 2/2016
CN 106099346 A 11/2016
(Continued)

*Primary Examiner* — Jason M Crawford
(74) *Attorney, Agent, or Firm* — HOUTTEMAN LAW LLC

(57) ABSTRACT

The present disclosure provides a phased array antenna, including a waveguide radiation unit, a phase shifter unit and a waveguide power dividing unit, a radiation patch and a first waveguide feed structure in the waveguide radiation unit are the same in number, and a first transmission port of each first waveguide feed structure is arranged corresponding to the radiation patch; the waveguide power dividing unit includes second waveguide feed structures, and a first transmission port of each second waveguide feed structure corresponds to a second feed region of at least one phase shifter; each of the first waveguide feed structure and the second waveguide feed structures includes a ridge waveguide structure; the ridge waveguide structure is provided with at least one sidewall; defining a waveguide cavity of the ridge waveguide structure; at least one ridge protruding toward the waveguide cavity is arranged on the at least one sidewall.

20 Claims, 13 Drawing Sheets

(51) Int. Cl.
*H01Q 21/00* (2006.01)
*H01Q 21/06* (2006.01)

(58) Field of Classification Search
CPC ...... H01Q 21/065; H01Q 3/26; H01Q 3/2658; H01Q 3/30; H01Q 3/36
See application file for complete search history.

(56) References Cited

U.S. PATENT DOCUMENTS

| | | | | | |
|---|---|---|---|---|---|
| 11,217,901 | B1 * | 1/2022 | Wink | H01Q 13/0283 | |
| 2021/0005981 | A1 * | 1/2021 | Kuwabara | H01Q 21/064 | |
| 2023/0098813 | A1 * | 3/2023 | Fang | H01Q 3/36 | 342/372 |
| 2023/0155266 | A1 * | 5/2023 | Fang | H01Q 1/50 | 343/850 |

FOREIGN PATENT DOCUMENTS

| | | | |
|---|---|---|---|
| WO | 2021179160 | A1 | 9/2021 |
| WO | 2021259142 | A1 | 12/2021 |

* cited by examiner

PHASED ARRAY ANTENNA

TECHNICAL FIELD

The present disclosure relates to the field of communication technology, and in particular to a phased array antenna.

BACKGROUND

At present, a waveguide-feed-based liquid crystal phased array antenna generally includes a waveguide power dividing unit, a phase shifter unit, and a waveguide radiation unit, and by taking the waveguide power dividing unit receiving a radio frequency signal as an example, the waveguide power dividing unit receives the radio frequency signal from outside, then transmits the radio frequency signal to the phase shifter unit, and the phase shifter unit performs phase shifting on the radio frequency signal and inputs the radio frequency signal subjected to the phase shifting to the waveguide radiation unit. The waveguide radiation unit includes a first waveguide feed structure in a shape of rectangular and a radiation element, the first waveguide feed structure in the shape of rectangular feeds the radio frequency signal from the phase shifter unit into the radiation element. The radio frequency signal transmitted by the first waveguide feed structure in the shape of rectangular is generally in a form of a linear polarized radiation signal, and thus the radiation element adopts a waveguide rectangular-circular converter to convert the linear polarized radiation signal at an output terminal of the first waveguide feed structure in the shape of rectangular into a circular polarized radiation signal, in cooperation with the first waveguide feed structure in the shape of rectangular. The waveguide rectangular-circular converter has a relatively large size, particularly in a longitudinal direction, so that the antenna has a relatively large thickness.

SUMMARY

The present disclosure aims to solve at least one technical problem in the related art, and provides a phased array antenna to reduce a space occupied by a waveguide radiation unit and a waveguide power dividing unit, so as to reduce an overall thickness of the phased array antenna.

In view of above, the present disclosure provides a phased array antenna, including a waveguide radiation unit, a phase shifter unit, and a waveguide power dividing unit, where the waveguide radiation unit includes a dielectric substrate, and a radiation patch and a first waveguide feed structure that are respectively disposed on two opposite sides of the dielectric substrate, the radiation patch and the first waveguide feed structure are the same in number, and a first transmission port of each first waveguide feed structure is disposed corresponding to the radiation patch; the phase shifter unit includes a phase shifter, the phase shifter and the first waveguide feed structure are the same in number, and a first feed region of each phase shifter is arranged corresponding to a second transmission port of the first waveguide feed structure; the waveguide power dividing unit includes a plurality of second waveguide feed structures, and a first transmission port of each second waveguide feed structure corresponds to a second feed region of at least one phase shifter; each of the first waveguide feed structure and the second waveguide feed structures includes a ridge waveguide structure; the ridge waveguide structure has at least one sidewall that defines a waveguide cavity of the ridge waveguide structure; at least one ridge protruding toward the waveguide cavity is provided on the at least one sidewall.

In some implementations, the ridge waveguide structure of each first waveguide feed structure has six connected sidewalls, including two opposite first sidewalls, two opposite second sidewalls and two opposite third sidewalls, each of the third sidewalls is connected between one of the first sidewalls and one of the second sidewalls; each of the first sidewalls is connected between one of the second sidewalls and one of the third sidewalls; each of the first sidewalls is perpendicular to a polarization direction of a linear polarized radiation signal, a first ridge and a second ridge are respectively arranged on the two first sidewalls, and the polarization direction of the linear polarized radiation signal is parallel to a connection line between the first ridge and the second ridge; the two third sidewalls are arranged oppositely along a first direction, each of the third sidewalls is perpendicular to the first direction, the linear polarized radiation signal transmitted by the first transmission port is decomposed into a first linear polarized sub-signal and a second linear polarized sub-signal that are orthogonal to each other without any phase difference, and the first direction is a polarization direction of the first linear polarized sub-signal.

In some implementations, the ridge waveguide structure of each second waveguide feed structure has four connected sidewalls, including two opposite fourth sidewalls and two opposite fifth sidewalls, respectively, each of the fourth sidewalls is perpendicular to the polarization direction of the linear polarized radiation signal, a third ridge and a fourth ridge are arranged on the two fourth sidewalls respectively, and the polarization direction of the linear polarized radiation signal transmitted by the first transmission port is parallel to a connection line between the third ridge and the fourth ridge.

In some implementations, the waveguide power dividing unit further includes a waveguide channel structure, the waveguide channel structure has a main transmission port and multiple transmission sub-ports, a number of the transmission sub-ports is the same as that of second transmission ports of the second waveguide feed structures, and the transmission sub-ports are disposed corresponding to the second transmission ports of the second waveguide feed structures.

In some implementations, the waveguide channel structure includes a main waveguide channel and a plurality of waveguide sub-channel groups, a port of the main waveguide channel serves as the main transmission port; the waveguide sub-channel groups are connected in sequence along a direction from the main transmission port to the transmission sub-ports, and for any two adjacent waveguide sub-channel groups, a number of waveguide sub-channels in one waveguide sub-channel group closer to the transmission sub-ports is two times a number of waveguide sub-channels in the other waveguide sub-channel group, and an end of each waveguide sub-channel in the one waveguide sub-channel group closer to the transmission sub-ports is correspondingly connected with ends of two waveguide sub-channels in the other waveguide sub-channel group; two waveguide sub-channels are arranged in the waveguide sub-channel group closest to the main waveguide channel, and an end of each of the two waveguide sub-channels is connected with an end of the main waveguide channel away from the main transmission port; an end of each of the waveguide sub-channels in the waveguide sub-channel group closest to the second waveguide feed structures serves as the transmission sub-port.

In some implementations, for any two adjacent waveguide sub-channel groups connected, an extending direction in which each waveguide sub-channel in one waveguide sub-channel group extends is perpendicular to an extending direction in which each waveguide sub-channel in the other waveguide sub-channel group extends.

In some implementations, at least a part of at least one waveguide sub-channel in at least one waveguide sub-channel group is curved.

In some implementations, each waveguide sub-channel in at least one waveguide sub-channel group includes at least two straight channel segments, axes of any two adjacent straight channel segments in extending directions in which the two adjacent straight channel segments extend are parallel to each other, and a bent channel segment is connected between any adjacent two straight channel segments.

In some implementations, the main waveguide channel includes a plurality of main channel segments with different calibers and connected in sequence, and the closer to the main transmission port, the smaller the caliber of the main channel segment is.

In some implementations, the waveguide power dividing unit further includes connection waveguide structures, a number of the connection waveguide structures is the same as that of the second waveguide feed structures, and a first transmission port of each connection waveguide structure is disposed corresponding to the second feed region of at least one phase shifter; a second transmission port of each connection waveguide structure is arranged corresponding to the first transmission port of each second waveguide feed structure.

In some implementations, the radiation patch includes a first patch and a second patch that are connected and disposed in a same layer; the first patch is configured to decompose the linear polarized radiation signal transmitted by the first transmission port into a first linear polarized sub-signal and a second linear polarized sub-signal that are orthogonal to each other without any phase difference; the second patch is configured to cause the first linear polarized sub-signal and the second linear polarized sub-signal to form a circular polarized radiation signal.

In some implementations, the first patch is in a shape of a center symmetric pattern; the second patch includes a first sub-patch, a second sub-patch, a third sub-patch and a fourth sub-patch; the first sub-patch and the second sub-patch are symmetrically arranged with respect to a first symmetry axis of the first patch; the third sub-patch and the fourth sub-patch are symmetrically arranged with respect to a second symmetry axis of the first patch; the first symmetry axis is relatively perpendicular to the second symmetry axis.

In some implementations, the first patch is square in shape, and an extending direction in which a diagonal of the first patch extends is parallel to a polarization direction of the linear polarized radiation signal; the first sub-patch is connected to a first side of the first patch, the second sub-patch is connected to a second side of the first patch, and the first side is opposite to the second edge; the third sub-patch is connected to a third side of the first patch, the fourth sub-patch is connected to a fourth side of the first patch, and the third side is opposite to the fourth side.

In some implementations, a length of a side of the first sub-patch connected to the first side is greater than a length of a side of the third sub-patch connected to the third side; a length of the first sub-patch in a direction perpendicular to the first symmetry axis is greater than a length of the third sub-patch in a direction perpendicular to the second symmetry axis.

In some implementations, a length of a side of the first sub-patch connected to the first side is less than or equal to a length of the first side, and a midpoint of the side of the first sub-patch connected to the first side coincides with a midpoint of the first side; a length of a side of the second sub-patch connected to the second side is less than or equal to a length of the second side, and a midpoint of the side of the second sub-patch connected to the second side coincides with a midpoint of the second side; a length of a side of the third sub-patch connected to the third side is less than a length of the third side, and a midpoint of the side of the third sub-patch connected to the third side coincides with a midpoint of the third side; a length of a side of the fourth sub-patch connected to the fourth side is less than a length of the fourth side, and a midpoint of the side of the fourth sub-pitch connected to the fourth side coincides with a midpoint of the fourth side.

In some implementations, the first sub-patch, the second sub-patch, the third sub-patch, and the fourth sub-patch each include a rectangular part and a trapezoidal part that are connected, a side of the rectangular part is connected to a side of the first patch corresponding thereto; a long bottom edge of the trapezoidal part is connected with a side of the rectangular part away from the first patch.

DESCRIPTION OF EMBODIMENTS

Figure 1:
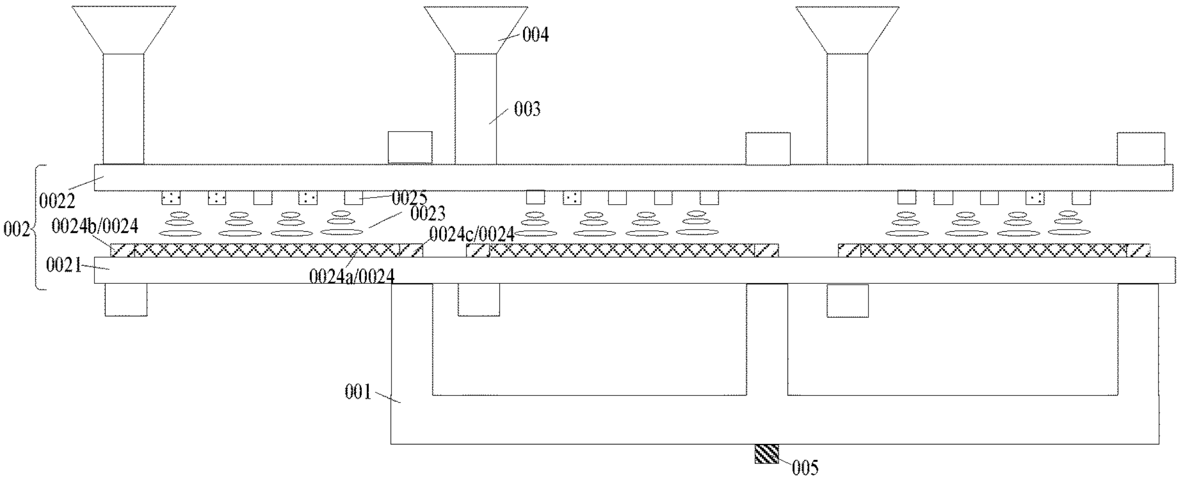
FIG. 1 is a schematic structural diagram of an antenna in the related art.

In order to make objects, technical solutions and advantages of the present disclosure more apparent, the present disclosure will be described in details with reference to the accompanying drawings. Implementations described below are only a part of implementations of the present disclosure, but not all implementations of the present disclosure. Other implementations, obtained by a person skilled in the art without making any creative effort based on the present disclosure, fall within the protection scope of the present disclosure.

Shapes and sizes of components in the drawings are not to scale, but are merely intended to facilitate an understanding of contents of the present disclosure.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of terms "a," "an," or "the" and similar referents does not denote a limitation of quantity, but rather denotes the presence of at least one. The word "include" or "comprise", and the like, means that the element or item preceding the word contains the element or item listed after the word and its equivalent, but does not exclude other elements or items. The terms "connected" or "coupled" and the like are not restricted to physical or mechanical connections, but may include electrical connections, whether direct or indirect. Terms "upper/on", "lower/below", "left", "right", and the like are used only to indicate relative positional relationships, and if an absolute position of an object being described is changed, the relative positional relationships may be changed accordingly.

The implementations of the present disclosure are not limited to those shown in the drawings, but include modifications of configurations formed based on a manufacturing process. Thus, regions illustrated in the figures have schematic properties, and shapes of the regions shown in the figures illustrate exemplary shapes of regions of elements, but are not intended to be limiting.

Figure 2:
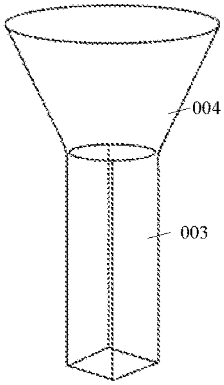
FIG. 2 is a schematic structural diagram of a waveguide rectangular-circular converter in the related art.

Referring to FIGS. 1 and 2, in the related art, a phased array antenna generally includes a waveguide power dividing unit 001, a phase shifter unit 002, and a waveguide radiation unit including a rectangular waveguide feed structure 003 and a radiation element 004. The waveguide power dividing unit 001 may serve as a front feed structure, receive a radio frequency signal from outside through an interface 005, and transmit the radio frequency signal to the phase shifter unit 002, the phase shifter unit 002 performs phase shifting on the radio frequency signal and inputs the radio frequency signal subjected to the phase shifting to the rectangular waveguide feed structure 003, and the rectangular waveguide feed structure 003 feeds the radio frequency signal to the radiation element 004. The radio frequency signal transmitted by the rectangular waveguide feed structure 003 is generally in a form of a linear polarized radiation signal, and thus in order to obtain a wider radiation direction, the radiation element 004 adopts a waveguide rectangular-circular converter to cooperate with the rectangular waveguide feed structure 003 to convert the linear polarized radiation signal output by the rectangular waveguide feed structure 003 into a circular polarized radiation signal. Referring to FIG. 2, the radiation element 004 is a circular waveguide with a caliber gradually decreasing from top to bottom, a transmission port at a lower end of the radiation element 004 is connected to the rectangular waveguide feed structure 003, and the radio frequency signal is transmitted from the rectangular waveguide feed structure 003 through the radiation element 004, so that the linear polarized radiation signal is converted into the circular polarized radiation signal. However, the radiation element 004 adopting the waveguide rectangular-circular converter has a relatively large size, particularly in a longitudinal direction, and thus a thickness of the antenna is relatively large.

Figure 3A:
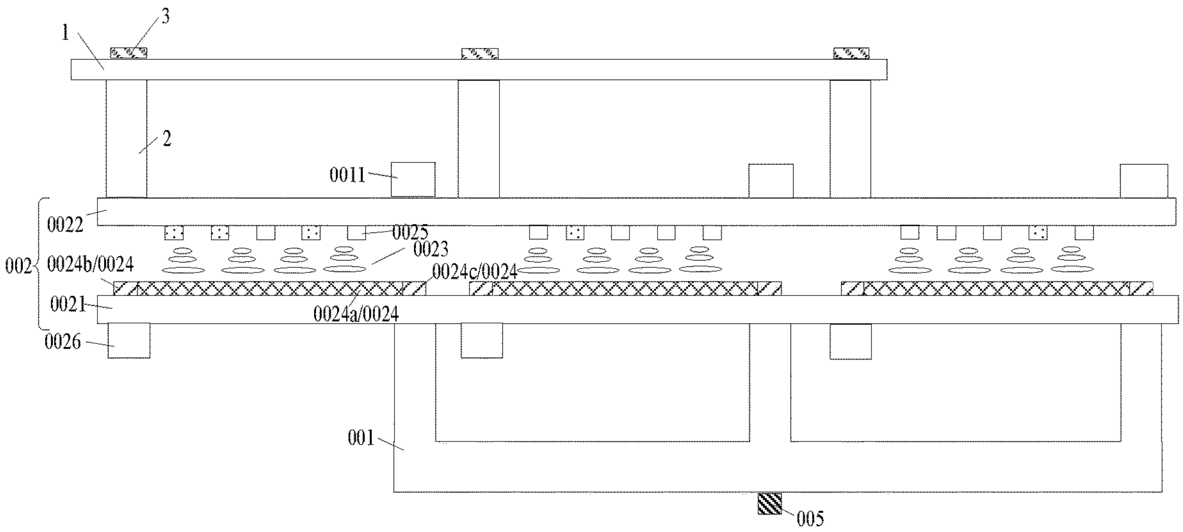
FIG. 3*a* is a schematic diagram (side view) of an exemplary structure of a phased array antenna according to the present disclosure.
Figure 3B:
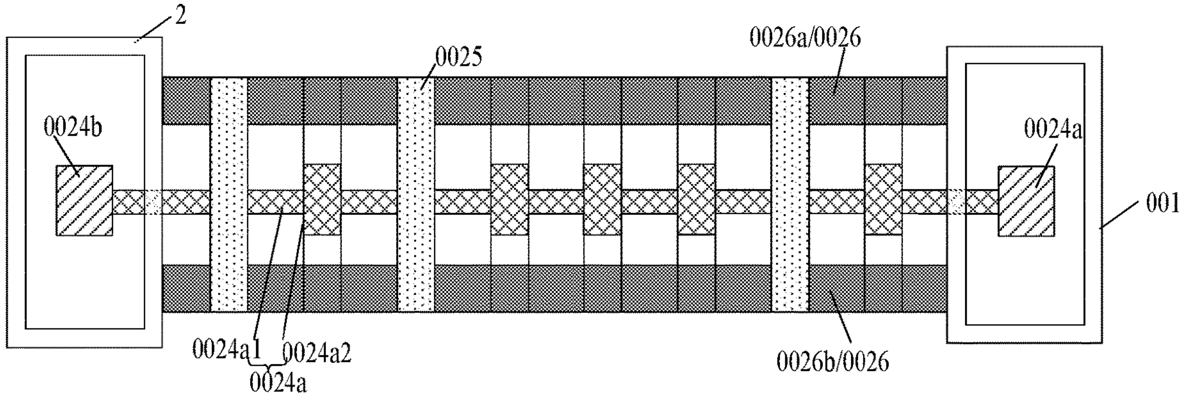
FIG. 3*b* is a schematic diagram (top view) of an exemplary CPW transmission structure of a phased array antenna according to the present disclosure.
Figure 5:
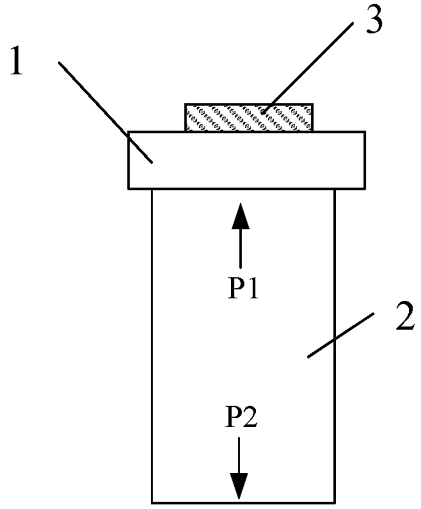
FIG. 5 is a schematic diagram (side view) of an exemplary structure of a waveguide radiation unit according to the present disclosure.

In order to solve the above problem, an embodiment of the present disclosure provides a phased array antenna, FIG. 3*a* is a schematic diagram (side view) of an exemplary structure of a phased array antenna according to the present disclosure, and FIG. 3*b* is a schematic structural diagram (top view) of an exemplary CPW transmission structure of a phased array antenna according to the present disclosure. FIG. 5 is a schematic diagram (side view) of an exemplary structure of a waveguide radiation unit according to the present disclosure. Referring to FIGS. 3*a*, 3*b* and 5, the phased array antenna includes a waveguide radiation unit, a phase shifter unit 002 and a waveguide power dividing unit 001, the waveguide radiation unit includes a dielectric substrate 1, and a radiation patch 3 and a first waveguide feed structure 2 respectively disposed on two opposite sides of the dielectric substrate 1. The first waveguide feed structure 2 has a first transmission port P1 and a second transmission port P2, the first transmission port P1 is closer to the radiation patch 3 than the second transmission port P2, the radiation patch 3 and the first waveguide feed structure 2 are the same in number, the first transmission port P1 of each first waveguide feed structure 2 is disposed corresponding to the radiation patch 3, that is, an orthographic projection of the first transmission port P1 on the dielectric substrate 1 is at least partially overlapped with an orthographic projection of the radiation patch 3 on the dielectric substrate 1, the radio frequency signal enters the first waveguide feed structure 2 from the second transmission port P2, and is then transmitted to the radiation patch 3 through the first transmission port P1, and in general, a radiation signal transmitted by the first transmission port P1 of the first waveguide feed structure 2 is a linear polarized radiation signal, and the radiation patch 3 is configured to convert the linear polarized radiation signal transmitted by the first transmission port P1 into a circular polarized radiation signal. Since the radiation patch 3 is of a patch structure, that is, a thin film conductive layer is manufactured on a side of the dielectric substrate 1, and then patterning is performed on the conductive layer to form the radiation patch 3, a space (especially a longitudinal space) occupied by the radiation patch 3 is relatively small, and in a case of applying the radiation patch 3 into an antenna, not only the radiation signal can be converted into a circular polarized radiation signal, in cooperation with the waveguide feed structure 2, but also increasing of the thickness of the antenna can be avoided.

The following describes an overall structure and an operation principle of an antenna according to the present disclosure with reference to FIGS. 3*a* and 3*b*. The waveguide radiation unit includes at least one first waveguide feed structure 2, a dielectric substrate 1 and at least one radiation patch 3. The waveguide power dividing unit 001 may serve as a front feed structure, and receive a radio frequency signal from outside through the interface 005, and then transmit the radio frequency signal to the phase shifter unit 002, the phase shifter unit 002 performs phase shifting on the radio frequency signal and then inputs the radio frequency signal subjected to the phase shifting to the second transmission port P2 of the first waveguide feed structure 2, the first waveguide feed structure 2 then feeds the radio frequency signal to the radiation patch 3 through the first transmission port P1, and the radiation patch 3 converts the linear polarized radiation signal output by the first waveguide feed structure 2 into a circular polarized radiation signal.

The phase shifter unit 002 includes a first substrate and a second substrate disposed opposite to each other, a dielectric layer disposed between the first substrate and the second substrate, and a plurality of phase shifters. The first substrate may include a first base 0021 and the second substrate includes a second base 0022; each phase shifter includes a transmission structure 0024 disposed on a side of the first base 0021 close to the second substrate, and a patch electrode 0025 disposed on a side of the second base 0022 close to the first substrate, referring to FIG. 3*b*, by taking the transmission structure 0024 being a coplanar waveguide (CPW) transmission structure as an example, the transmission structure 0024 includes a central transmission line 0024*a*, and a first transmission electrode 0024*b* and a second transmission electrode 0025*c* connected to both ends of the central transmission line 0024*a*, and a reference voltage line 0026 disposed on at least one side of the central transmission line 0024*a*, and by taking the reference voltage line 0026 including a first reference voltage line 0026*a* and a second reference voltage line 0026*b* as an example, the first reference voltage line 0026*a* and the second reference voltage line 0026*b* are disposed on both sides of the central transmission line 0024*a* respectively, and are spaced from the central transmission line 0024*a*.

The dielectric layer may be various types of adjustable dielectrics, for example, the dielectric layer may include adjustable dielectrics such as liquid crystal molecules 0023 or ferroelectrics, and by taking the dielectric layer including liquid crystal molecules 0023 as an example, a deflection angle of the liquid crystal molecules can be changed by applying voltages to the patch electrode 0025 and the CPW transmission structure, so as to change a dielectric constant of the dielectric layer, thereby achieving a purpose of phase shifting. In some examples, the liquid crystal molecules 0023 in the dielectric layer are positive liquid crystal molecules or negative liquid crystal molecules, and it should be noted that in a case where the liquid crystal molecules 0023 are positive liquid crystal molecules, an included angle between a long axial direction of the liquid crystal molecules 0023 and the patch electrode 0025 is greater than 0 degree and less than or equal to 45 degrees, and in a case where the liquid crystal molecules 0023 are negative liquid crystal molecules, the included angle between the long axial direction of the liquid crystal molecules 0023 and the patch electrode 0025 is greater than 45 degrees and less than 90 degrees, so that the dielectric constant of the dielectric layer is changed due to deflecting of the liquid crystal molecules 0023, and the purpose of phase shifting is achieved.

The waveguide power dividing unit 001 may have various structures, such as a waveguide structure, and by taking the waveguide power dividing unit 001 having a waveguide structure as an example, the waveguide power dividing unit 001 may include a main waveguide channel and a plurality of waveguide sub-channels connected to the main waveguide channel. The phased array antenna according to the present disclosure may further include a signal connector 005, an end of the signal connector 005 is connected to an external signal line, another end of the signal connector 005 is connected to the main waveguide channel of the waveguide power dividing unit 001 for inputting a radio frequency signal, the main waveguide channel divides the radio frequency signal into multiple sub-signals, each of the multiple sub-signals is coupled to one of the first transmission electrode 0024*b* and the second transmission electrode 0025*c* of the phase shifter through the waveguide sub-channel, and is transmitted to the other one of the first transmission electrode 0024*b* and the second transmission electrode 0025*c* of the phase shifter through the central transmission line 0024*a*, the other one of the first transmission electrode 0024*b* and the second transmission electrode 0025*c* of the phase shifter then couples the radio frequency signal subjected to the phase shifting to the second transmission port P2 of the first waveguide feed structure 2 corresponding thereto, the first waveguide feed structure 2 feeds the radio frequency signal to the radiation patch 3 through the first transmission port P1, and the radiation patch 3 converts the linear polarized radiation signal output by the first waveguide feed structure 2 into a circular polarized radiation signal. The signal connector 005 may be any type of connector, such as a SubMiniature version A (SMA) connector, which is not limited in the present disclosure.

It should be noted that, the phase shifter unit 002 may include a plurality of phase shifters, the number of the phase shifters is the same as that of first waveguide feed structures 2, and a first feed region (i.e., one of the first transmission electrode 0024*b* and the second transmission electrode 0025*c*) of each phase shifter is disposed corresponding to the second transmission port P2 of the first waveguide feed structure 2; each phase shifter corresponds to one or more patch electrodes 0025, and an electric field, formed by applying voltages to each phase shifter and the central transmission line 0024*a* of the CPW transmission structure 0024, drives the liquid crystal molecules 0023 in the dielectric layer to deflect, so that the dielectric constant of the dielectric layer is changed, and a phase of a microwave signal is changed, moreover, by applying voltages to the patch electrode 0025 and the central transmission line 0024*a*, different phase shifters correspond to different phase shift amounts, that is, each phase shifter correspondingly adjusts one phase shift amount, so that, for each phase shift amount to be adjusted, corresponding voltages are applied to control the corresponding phase shifter according to the phase shift amount to be adjusted, and not all the phase shifters are applied with voltages, which facilitates to controlling the phase shifter unit 002, and resulting in a low power consumption.

In some examples, to smooth a transmission of the radio frequency signal, with continued reference to FIG. 3*b*, based on the structure described above, the central transmission line 0024*a* of the CPW transmission structure 0024 may include a main structure 0024*a*1 extending along a length direction of the first base 0021, and branch structures 0024*a*2 disposed on the main structure 0024*a*1 and spaced apart from each other, and an orthographic projection of the patch electrode 0025 on the first base 0021 at least partially overlaps with orthographic projections of the branch structures 0024*a*2 on the first base 0021. In some implementations, the branch structures 0024*a*2 and the main structure 0024*a*1 may be formed into one piece, that is, the branch structures 0024*a*2 and the main structure 0024*a*1 are disposed in a same layer and made of a same material; in such case, a preparation of the branch structures 0024*a*2 and the main structure 0024*a*1 is facilitated, and a process cost is reduced. Certainly, the branch structures 0024*a*2 and the main structure 0024*a*1 may be electrically connected together by any means, which is not limited in any way in the present disclosure.

The phased array antenna provided by the present disclosure may further include a first reflective structure 0011 and a second reflective structure 0026. The first reflective structure 0011 is provided on a side opposite to the transmission port of the waveguide power dividing unit 001 close to the phase shifter unit 002, for example, may be provided on a side of the second base 0022 away from the first base 0021, and the first reflective structure 0011 reflects the radio frequency signal, got out from the transmission port of the waveguide power dividing unit 001 toward a direction away from the waveguide power dividing unit 001, into a waveguide cavity of the waveguide power dividing unit 001, to effectively increase a radiation efficiency. Similarly, the second reflective structure 0026 is provided on a side opposite to the transmission port of the first waveguide feed structure 2 close to the phase shifter unit 002 (i.e., away from the dielectric substrate 1), for example, may be provided on a side of the first base 0021 away from the second base 0022, the second reflective structure 0026 reflects the radio frequency signal, got out from the transmission port of the first waveguide feed structure 2 toward a direction away from the first waveguide feed structure 2, into a waveguide cavity of the first waveguide feed structure 2, to effectively increase a radiation efficiency.

It should be noted that structures of the phase shifter unit 002 shown in FIGS. 3*a* and 3*b* are exemplary structures, and the antenna provided by the present disclosure may be implemented into various structures, which is not limited herein. For example, the phase shifter unit 002 may include an antarafacial phase shifter, and each phase shifter may be linear and/or curved.

Figure 4A:
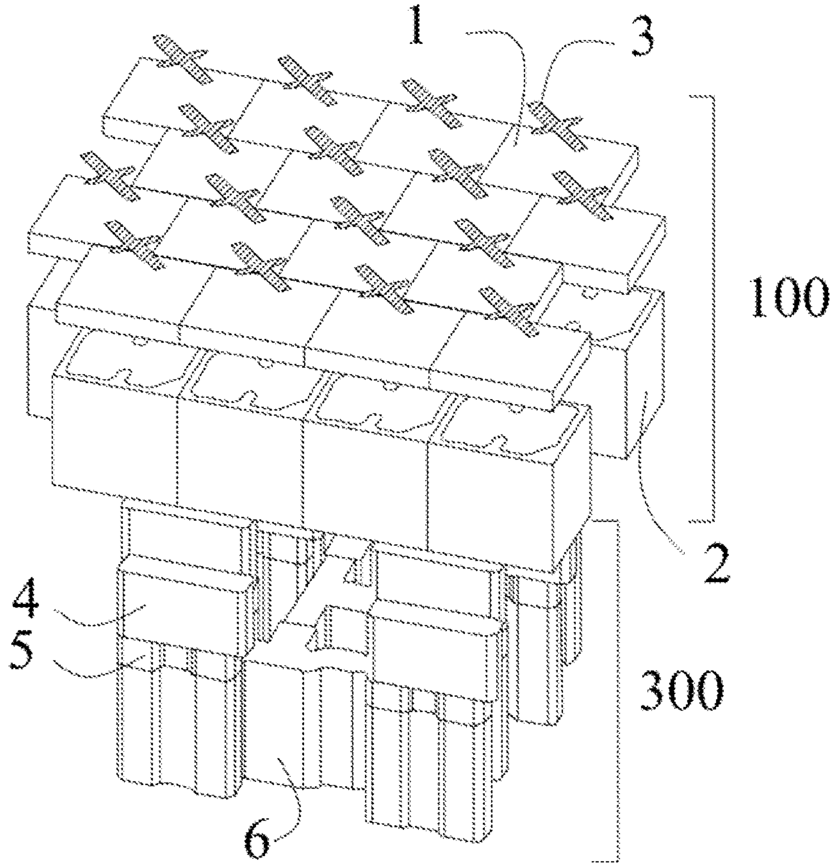
FIG. 4*a* is a schematic diagram (exploded view) of an exemplary structure of a phased array antenna according to the present disclosure.
Figure 4B:
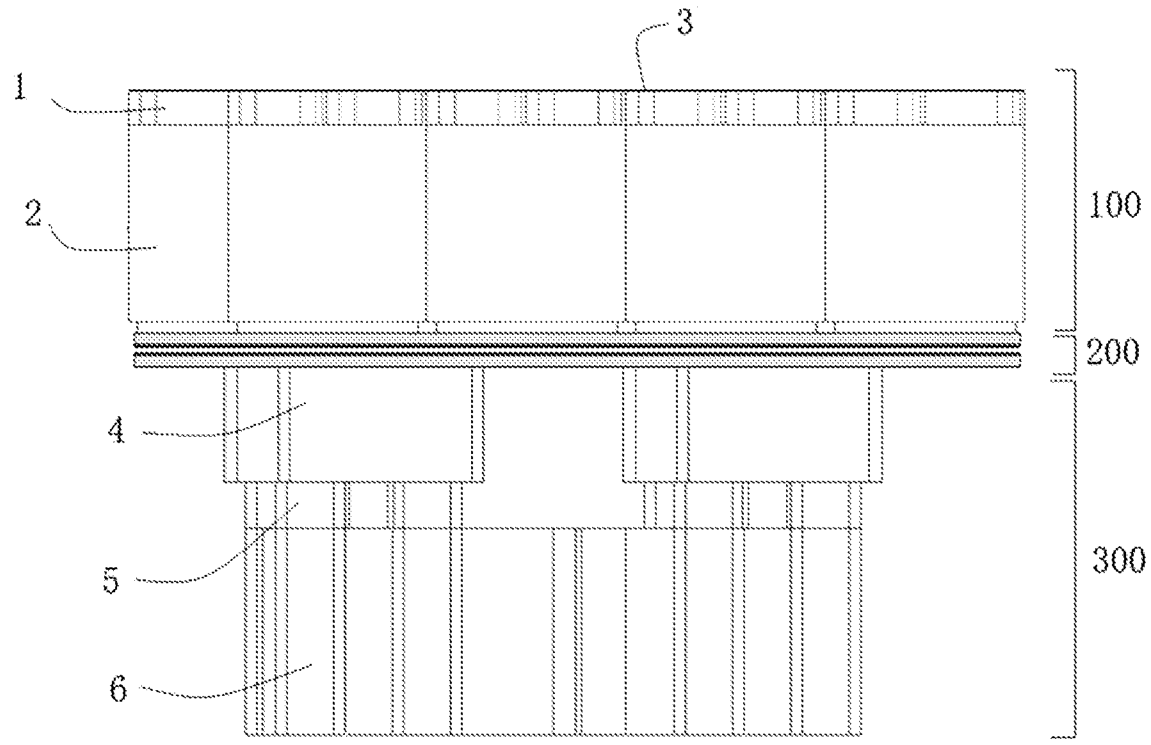
FIG. 4*b* is a schematic diagram (side view) of another exemplary structure of a phased array antenna according to the present disclosure.

FIG. 4*a* is a schematic diagram (exploded view) of an exemplary structure of a phased array antenna according to the present disclosure, and FIG. 4*b* is a schematic diagram (side view) of an exemplary structure of a phased array antenna according to the present disclosure. Referring to FIGS. 4*a* and 4*b*, in some examples, the phased array antenna includes a waveguide radiation unit 100, a phase shifter unit 200, and a waveguide power dividing unit 300, the waveguide radiation unit 100 includes a dielectric substrate 1, and a radiation patch 3 and a first waveguide feed structure 2 respectively disposed on two opposite sides of the dielectric substrate 1. The dielectric substrate 1 is of a divided structure, that is, is composed of a plurality of dielectric sub-substrates, and the number of the dielectric sub-substrates is the same as that of radiation patches 3, and the dielectric sub-substrates are arranged corresponding to the radiation patches 3. In some implementations, the dielectric sub-substrates are arranged in an array, for example, in a rectangular array, a triangular array, or the like, and by taking the dielectric substrate 1 shown in FIG. 4*a* as an example, the dielectric sub-substrates are arranged in multiple rows, and the dielectric sub-substrates in any two adjacent rows are staggered with each other. Each dielectric sub-substrate is provided with one radiation patch 3 and one first waveguide feed structure 2 respectively on opposite sides thereof. Structures and functions of the radiation patch 3, the first waveguide feed structure 2 and the phase shifter unit 200 are respectively similar to those of the radiation patch 3, the first waveguide feed structure 2 and the phase shifter unit 002 shown in FIG. 3*a*, and will not be described again here.

The waveguide power dividing unit 300 includes a plurality of connection waveguide structures 4 and a plurality of second waveguide feed structures 5, the number of the connection waveguide structures 4 is the same as that of the second waveguide feed structures 5, and a first transmission port of each connection waveguide structure 4 is disposed corresponding to a second feed region of at least one phase shifter (i.e., the other one of the first transmission electrode 0024*b* and the second transmission electrode 0025*c*), that is, each connection waveguide structure 4 may correspond to the second feed region of one phase shifter, or may correspond to second feed regions of multiple phase shifters; a second transmission port of each connection waveguide structure 4 is arranged corresponding to a first transmission port of the second waveguide feed structure 5. For example, as shown in FIG. 4*a*, each second waveguide feed structure 5 is arranged corresponding to second feed regions of two phase shifters.

In some examples, each connection waveguide structure 4 may be defined by sidewalls formed of a conductive material, or may be formed by forming a waveguide cavity in a single piece of conductive material, which is not limited herein. The waveguide cavity of each connection waveguide structure 4 may be of various shapes, for example, may be a rectangular waveguide cavity, a circular waveguide cavity, and the like.

It should be noted that, in practical applications, the connection waveguide structures 4 may be omitted, and in such case, the first transmission port of the second waveguide feed structure 5 is arranged corresponding to the second feed region of at least one phase shifter (i.e. the other one of the first transmission electrode 0024*b* and the second transmission electrode 0025*c*).

In the phased array antenna provided by the present disclosure, each of the first waveguide feed structure 2 and the second waveguide feed structure 5 includes a ridge waveguide structure, and by adopting the ridge waveguide structure, it facilitates to miniaturizing an arrangement of waveguide feed structures, so that a space to be occupied is saved, and a loss is reduced. The following describes structures of ridge waveguide structures employed by the first waveguide feed structure 2 and the second waveguide feed structure 5, respectively, in implementations.

Figure 6:
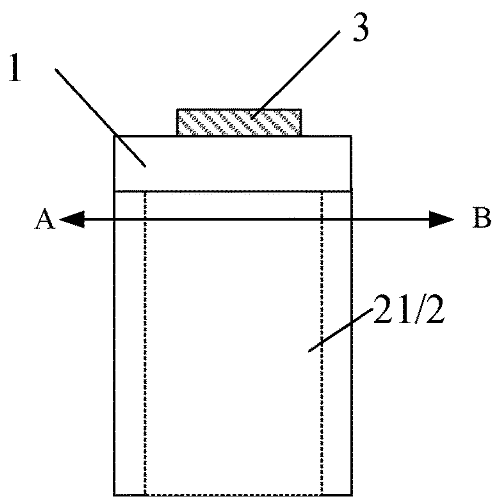
FIG. 6 is a schematic diagram (side view) of an exemplary structure of a waveguide radiation unit according to the present disclosure.
Figure 7:
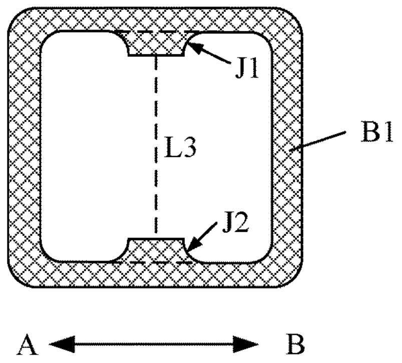
FIG. 7 is a sectional view taken along a line A-B of FIG. 6.
Figure 8:
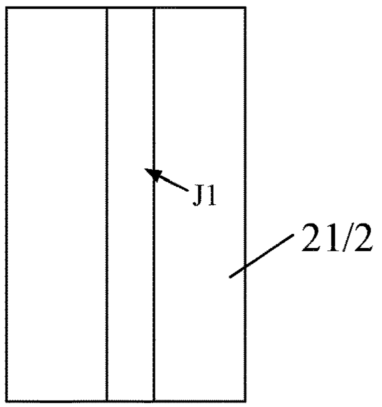
FIG. 8 is a schematic diagram (side view) of an exemplary structure of a waveguide radiation unit according to the present disclosure.

FIG. 6 is a schematic diagram (side view) of an exemplary structure of a waveguide radiation unit according to the present disclosure. FIG. 7 is a sectional view taken along a line A-B of FIG. 6. FIG. 8 is a schematic diagram (side view) of an exemplary structure of a waveguide radiation unit according to the present disclosure. In the phased array antenna provided by the present disclosure, the first waveguide feed structure 2 includes a ridge waveguide structure 21. The ridge waveguide structure 21 has at least one sidewall, and the at least one sidewall defines a waveguide cavity of the ridge waveguide structure 21, and if the ridge waveguide structure 21 has only one sidewall, the ridge waveguide structure 21 is a circular waveguide structure, and a circular hollow pipe enclosed by the one sidewall forms the waveguide cavity of the ridge waveguide structure 21. The ridge waveguide structure 21 may also include a plurality of sidewalls that are joined to form waveguide cavities of various shapes. At least one ridge (for example, as denoted by J1 or J2 in FIG. 7) protruding toward inside of the waveguide cavity of the ridge waveguide structure 21 is disposed on at least one sidewall of the ridge waveguide structure 21, an extending direction in which the ridge extends is parallel to an extending direction in which the sidewall of the ridge waveguide structure 21 extends, that is, parallel to a direction from the first transmission port P1 to the second transmission port P2, for example, as shown in FIG. 8, the extending direction in which the ridge J1 extends is parallel to the extending direction in which the sidewall of the ridge waveguide structure 21 extends, and a length of the ridge J1 is equal to a length of the sidewall of the ridge waveguide structure 21 in the extending direction in which the sidewall of the ridge waveguide structure 21 extends.

It should be noted that, in the phased array antenna provided by the present disclosure, the first waveguide feed structure 2 (including the ridge waveguide structure 21) may be defined by a sidewall formed of a conductive material (as shown in FIG. 8), or may be obtained by forming a cavity in a single piece of conductive material (as shown in FIGS. 6 and 13), which is not limited herein.

In some examples, referring to FIGS. 6 and 7, by taking the ridge waveguide structure 21 including four connected sidewalls B1 as an example, the four connected sidewalls B1 define a rectangular waveguide cavity, and a first ridge J1 and a second ridge J2 are respectively disposed on inner walls of two opposite sidewalls B1, and an extending direction in which each of the first ridge J1 and the second ridge J2 extends is parallel to an extending direction in which the sidewalls of the ridge waveguide structure 21 extend, that is, parallel to a direction from the first transmission port P1 to the second transmission port P2. For the first waveguide feed structure 2 having the ridge waveguide structure 21, due to a distribution of the radio frequency signal, a polarization direction E1 of the linear polarized radiation signal transmitted by the first transmission port P1 of the first waveguide feed structure 2 is defined by a direction of a connection line L3 between the first ridge J1 and the second ridge J2, in other words, the polarization direction E1 of the linear polarized radiation signal transmitted by the first transmission port P1 of the first waveguide feed structure 2 is parallel to an extending direction in which the connection line L3 between the first ridge J1 and the second ridge J2 extends.

Figure 9:
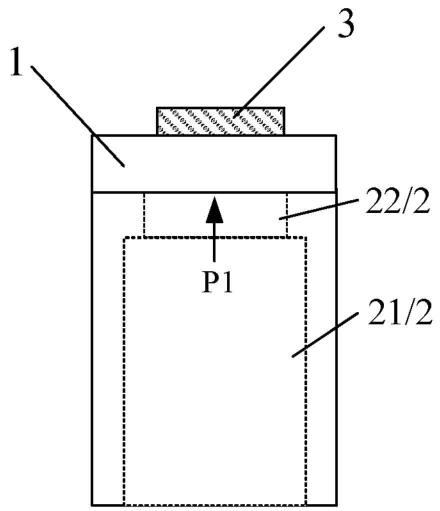
FIG. 9 is a schematic diagram (side view) of an exemplary structure of a waveguide radiation unit according to the present disclosure.

FIG. 9 is a schematic diagram (side view) of an exemplary structure of a waveguide radiation unit according to the present disclosure. Referring to FIG. 9, in some examples, the first waveguide feed structure 2 includes a ridge waveguide structure 21 and a feed-out waveguide structure 22 connected to the ridge waveguide structure 21, the feed-out waveguide structure 22 is close to the dielectric substrate 1 than the ridge waveguide structure 21, a transmission port of the ridge waveguide structure 21 away from the dielectric substrate 1 receives a radio frequency signal fed in, and feeds the radio frequency signal into the feed-out waveguide structure 22, a transmission port of the feed-out waveguide structure 22 away from the ridge waveguide structure 21 couples the radio frequency signal to the radiation patch 3, and thus the feed-out waveguide structure 22 is configured to accumulate energy of the radio frequency signal transmitted by the ridge waveguide structure 21. In the present disclosure, the transmission port of the feed-out waveguide structure 22 away from the ride waveguide structure 21 is the first transmission port P1, and the transmission port of the ride waveguide structure 21 away from the feed-out waveguide structure 22 is the second transmission port P2.

In some examples, as described above, the feed-out waveguide structure 22 may be defined by sidewalls formed of a conductive material, or may be obtained by forming a waveguide cavity in a single piece of conductive material, which is not limited herein. The waveguide cavity of the feed-out waveguide structure 22 may be a waveguide cavity of various shapes, for example, may be a rectangular waveguide cavity, a circular waveguide cavity, or the like, as long as the waveguide cavity of the feed-out waveguide structure 22 is of a center symmetric shape, in other words, an orthographic projection of the waveguide cavity of the feed-out waveguide structure 22 on the dielectric substrate 1 is a center symmetric pattern. Further, a caliber of the waveguide cavity of the feed-out waveguide structure 22 may be greater than a caliber of the waveguide cavity of the ridge waveguide structure 21, or may be less than or equal to the caliber of the waveguide cavity of the ridge waveguide structure 21, which is not limited herein.

Figure 10:
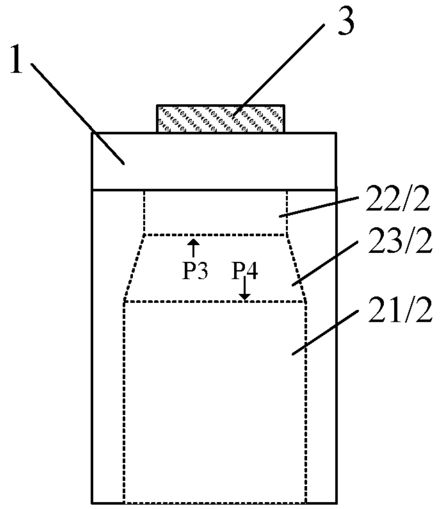
FIG. 10 is a schematic diagram (side view) of an exemplary structure of a waveguide radiation unit according to the present disclosure.

FIG. 10 is a schematic diagram (a side view) of an exemplary structure of a waveguide radiation unit according to the present disclosure. Referring to FIG. 10, in some examples, the first waveguide feed structure 2 includes a ridge waveguide structure 21, a feed-out waveguide structure 22, and a transition waveguide structure 23, the transition waveguide structure 23 is connected between the feed-out waveguide structure 22 and the ridge waveguide structure 21, if the caliber or a sectional shape of the waveguide cavity of the feed-out waveguide structure 22 is different from the caliber or a sectional shape of the waveguide cavity of the ridge waveguide structure 21, the transition waveguide structure 23 serves as a connection transition structure to smoothly transition the caliber and the shape of the waveguide cavity of the ridge waveguide structure 21 to the caliber and the shape of the waveguide cavity of the feed-out waveguide structure 22, therefore, in a direction from the ridge waveguide structure 21 to the feed-out waveguide structure 22, a caliber and a shape of a waveguide cavity of the transition waveguide structure 23 continuously and uniformly change, from a caliber and a shape of a transmission port of the waveguide cavity of the ridge waveguide structure 21 close to the dielectric substrate 1, to a caliber and a shape of a transmission port of the waveguide cavity of the feed-out waveguide structure 22 away from the dielectric substrate 1. In the present disclosure, a transmission port of the transition waveguide structure 23 away from the ridge waveguide structure 21 is a first transmission port P3, and a transmission port of the transition waveguide structure 23 away from the feed-out waveguide structure 22 is a second transmission port P4.

It should be noted that, a thickness of a sidewall of at least one of the ridge waveguide structure 21, the feed-out waveguide structure 22, and the transition waveguide structure 23 may be 4 to 6 times a surface effect depth of the radio frequency signal transmitted, which is not limited herein.

In some examples, the waveguide cavity of at least one of the ridge waveguide structure 21, the feed-out waveguide structure 22, and the transition waveguide structure 23 may be filled with a filling medium to increase the dielectric constant in entirety thereof. The filling medium may include a variety of mediums, for example, the filling medium may be polytetrafluoroethylene.

Figure 11:
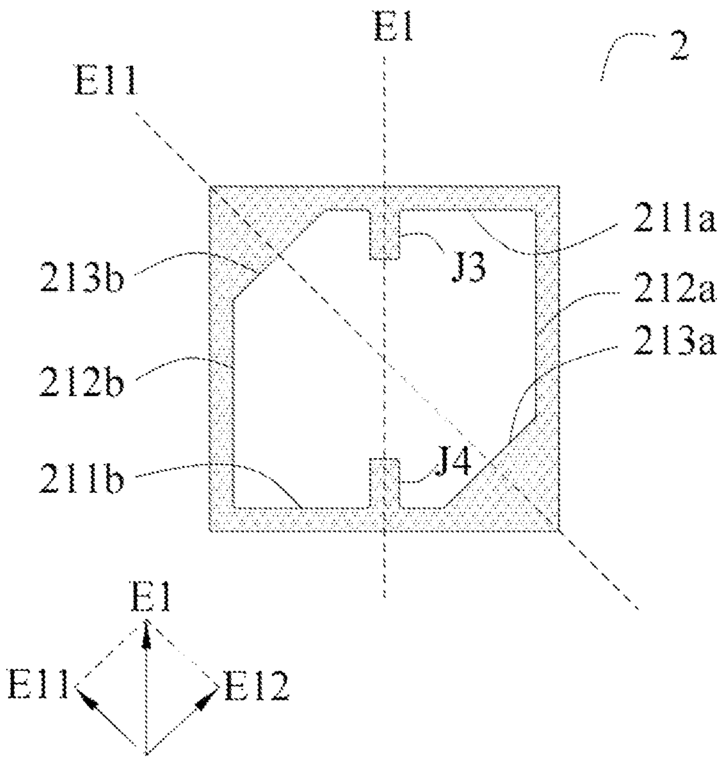
FIG. 11 is a schematic diagram (sectional view) of an exemplary structure of a first waveguide feed structure according to the present disclosure.

In some examples, in order to further circularly polarize a bandwidth and reduce an axial ratio, the first waveguide feed structure 2 may have a ridge waveguide structure to be described below, and FIG. 11 is a schematic diagram (sectional view) of an exemplary structure of a first waveguide feed structure according to the present disclosure. Referring to FIG. 11, the ridge waveguide structure of each first waveguide feed structure 2 has six connected sidewalls, including two opposite first sidewalls (211*a*, 211*b*), two opposite second sidewalls (212*a*, 212*b*), and two opposite third sidewalls (213*a*, 213*b*), each third sidewall is connected between one first sidewall and one second sidewall, that is, the third sidewall 213*a* is connected between the first sidewall 211*b* and the second sidewall 212*a*, and the third sidewall 213*b* is connected between the first sidewall 211*a* and the second sidewall 212*b*; each first sidewall is connected between one second sidewall and one third sidewall, that is, the first sidewall 211*a* is connected between the second sidewall 212*a* and the third sidewall 213*b*, and the first sidewall 211*b* is connected between the second sidewall 212*b* and the third sidewall 213*a*.

Furthermore, both first sidewalls (211*a*, 211*b*) are perpendicular to a polarization direction E1 of a linear polarized radiation signal transmitted by the first transmission port P1 of the first waveguide feed structure 2, and a first ridge J3 and a second ridge J4 are respectively provided on the first sidewalls (211*a*, 211*b*), and the polarization direction E1 of the linear polarized radiation signal is parallel to a connection line between the first ridge J3 and the second ridge J4. The first ridge J3 and the second ridge J4 may have structures the same as those of the first ridge J1 and the second ridge J2 shown in FIG. 7, and in such case, a length of each of the first ridge J3 and the second ridge J4 in a direction in which the connection line between the first ridge J3 and the second ridge J4 extends may be increased with respect to the first ridge J1 and the second ridge J2, which helps to achieve a miniaturization of size of a waveguide port, and in practical applications, the length of each of the first ridge J3 and the second ridge J4 in the direction in which the connection line between the first ridge J3 and the second ridge J4 extends may be set according to a frequency, for example, the length approaches a dimension of a widthwise side of a rectangular waveguide at the frequency, which is beneficial to achieve matching.

The third sidewalls (213*a*, 213*b*) are oppositely arranged along a first direction, and each third sidewall is perpendicular to the first direction. The linear polarized radiation signal transmitted by the first transmission port P1 of the first waveguide feed structure 2 is decomposed into a first linear polarized sub-signal and a second linear polarized sub-signal that are orthogonal to each other without any phase difference, a polarization direction of the linear polarized radiation signal is E1, a polarization direction of the first linear polarized sub-signal is E11, a polarization direction of the second linear polarized sub-signal is E12, and the first direction is the polarization direction E11 of the first linear polarized sub-signal. With the third sidewalls (213 *a*, 213 *b*), the bandwidth can be further circularly polarized, and the axial ratio is reduced.

Figure 12:
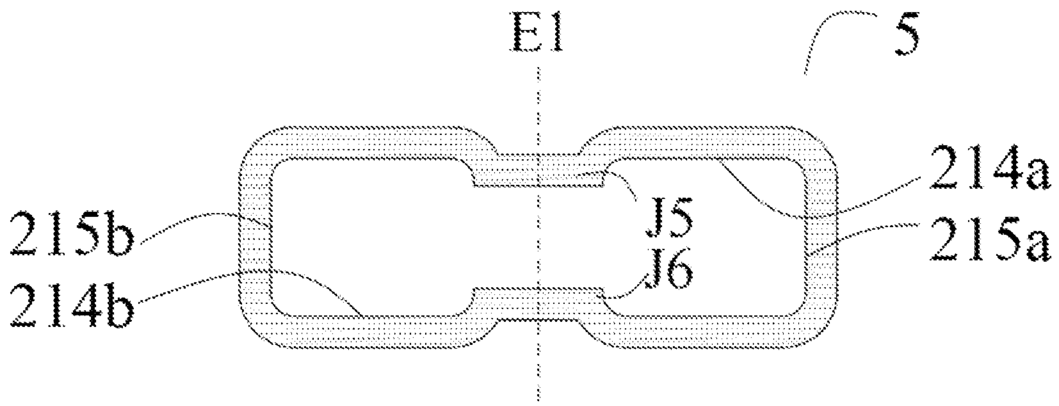
FIG. 12 is a schematic diagram (sectional view) of an exemplary structure of a second waveguide feed structure according to the present disclosure.

FIG. 12 is a schematic diagram (sectional view) of an exemplary structure of a second waveguide feed structure according to the present disclosure. Referring to FIG. 12, in the phased array antenna provided by the present disclosure, the second waveguide feed structure 5 includes a ridge waveguide structure, the ridge waveguide structure is provided with at least one sidewall, the at least one sidewall defines a waveguide cavity of the ridge waveguide structure, if the ridge waveguide structure is provided with only one sidewall, the ridge waveguide structure is a circular waveguide structure, and a circular hollow pipe enclosed by the one sidewall forms the waveguide cavity of the ridge waveguide structure. The ridge waveguide structure of the second waveguide feed structure 5 may also include a plurality of sidewalls connected to form a waveguide cavity of various shapes, at least one ridge protruding toward inside of the waveguide cavity of the ridge waveguide structure is disposed on at least one sidewall of the ridge waveguide structure (for example, as denoted by J5 or J6 in FIG. 12), and similar to the ridge of the ridge waveguide structure of the first waveguide feed structure 2, an extending direction in which the ridge of the ridge waveguide structure of the second waveguide feed structure 5 extends is parallel to an extending direction in which the sidewall of the ridge waveguide structure extends, that is, parallel to a direction from the first transmission port to the second transmission port of the second waveguide feed structure 5, and in some implementations, a length of the ridge and a length of the sidewall of the ridge waveguide structure of the second waveguide feed structure 5 in the extending direction in which the sidewall of the ridge waveguide structure extends are equal to each other.

It should be noted that, in the phased array antenna provided by the present disclosure, the second waveguide feed structure 5 (including the ridge waveguide structure) may be defined by a sidewall formed of a conductive material, or may be obtained by forming a cavity in a single piece of conductive material, which is not limited herein.

Referring to FIG. 12, by taking a case where the ridge waveguide structure includes four connected sidewalls as an example, in some examples, the four connected sidewalls defines a rectangular waveguide cavity, the four connected sidewalls include two opposite fourth sidewalls (214*a*, 214*b*) and two opposite fifth sidewalls (215*a*, 215*b*), a third ridge J5 and a fourth ridge J6 are respectively disposed on inner walls of the fourth sidewalls (214*a*, 214*b*), and an extending direction in which each of the third ridge J5 and the fourth ridge J6 extends is parallel to an extending direction in which each of the sidewalls of the ridge waveguide structure extends. For the second waveguide feed structure 5 having the ridge waveguide structure, similar to the first waveguide feed structure 2, the polarization direction E1 of the linear polarized radiation signal is parallel to an extending direction in which a connection line between the third ridge J5 and the fourth ridge J6 extends.

Figure 13A:
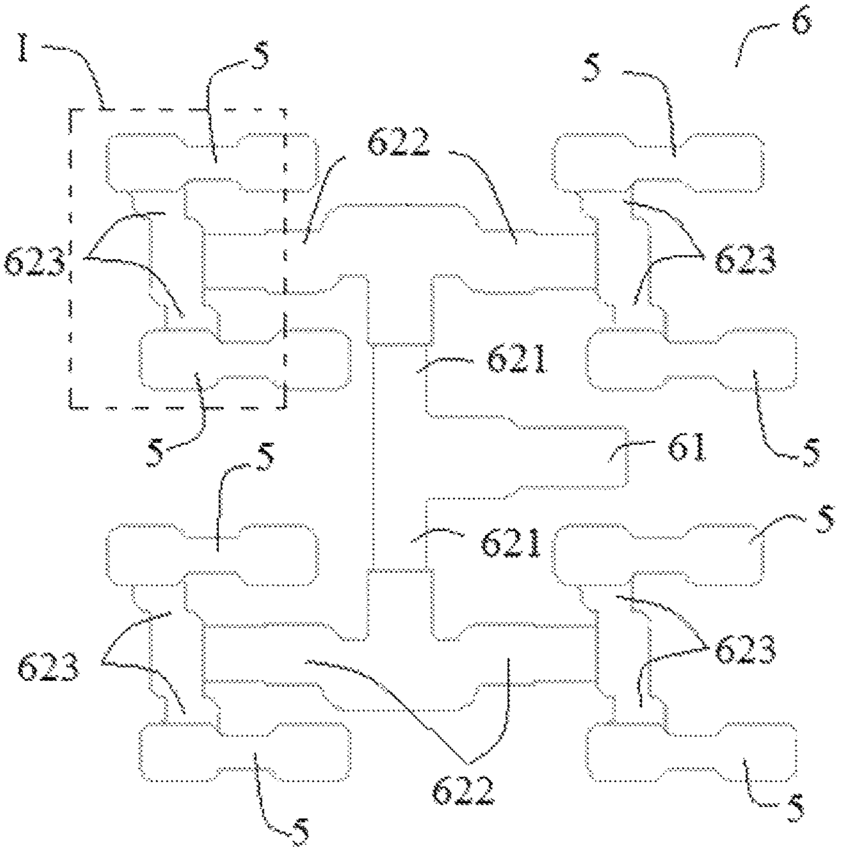
FIG. 13*a* is a schematic diagram (sectional view) of an exemplary structure of a waveguide power dividing unit according to the present disclosure.

FIG. 13*a* is a schematic diagram (sectional view) of an exemplary structure of a waveguide power dividing unit according to the present disclosure. Referring to FIG. 13*a*, in some examples, the waveguide power dividing unit 300 further includes a waveguide channel structure 6, the waveguide channel structure 6 has a main transmission port and a plurality of transmission sub-ports, the number of the transmission sub-ports is the same as the number of second transmission ports of the second waveguide feed structures 5, and each transmission sub-port is disposed corresponding to the second transmission port of the second waveguide feed structure 5. The main transmission port of the waveguide channel structure 6 may receive a radio frequency signal from outside through an interface, and then transmit the radio frequency signal to the second waveguide feed structures 5 through the transmission sub-ports.

The waveguide channel structure 6 may have various types of structures, and a shape and a size of the waveguide channel structure 6 each may be implemented in various implementations, as long as the waveguide channel structure 6 can transmit the radio frequency signal received from outside to the second waveguide feed structures 5. The structure of the waveguide channel structure 6 is described below by taking an implementation as an example.

The waveguide channel structure 6 includes a main waveguide channel 61 and a plurality of waveguide sub-channel groups, one port of the main waveguide channel 61 serves as the main transmission port mentioned above for receiving the radio frequency signal from outside, for example, is connected to a receiver. The waveguide sub-channel groups are connected in sequence in a direction from the main transmission port to the transmission sub-ports (i.e., a transmission direction of the radio frequency signal), and for any two adjacent waveguide sub-channel groups, the number of waveguide sub-channels in one waveguide sub-channel group closer to the transmission sub-ports is two times the number of waveguide sub-channels in the other waveguide sub-channel group, and an end of each waveguide sub-channel in the one waveguide sub-channel group closer to the transmission sub-ports is correspondingly connected to ends of two waveguide sub-channels in the other waveguide sub-channel group. Two waveguide sub-channels are provided in the waveguide sub-channel group closest to the main waveguide channel 61, and both ends of the two waveguide sub-channels are connected to an end of the main waveguide channel 61 away from the main transmission port; ends of waveguide sub-channels in the waveguide sub-channel group closest to the second waveguide feed structures 5 serve as the transmission sub-ports.

FIG. 13*a* shows three waveguide sub-channel groups, including a first waveguide sub-channel group, a second waveguide sub-channel group and a third waveguide sub-channel group, respectively, in a direction from the main transmission port to the transmission sub-ports, the first waveguide sub-channel group includes two waveguide sub-channels 621; the second waveguide sub-channel group includes four waveguide sub-channels 622; and the third waveguide sub-channel group includes eight waveguide sub-channels 623. The first waveguide sub-channel group is closest to the main waveguide channel 61, and both ends of the two waveguide sub-channels 621 in the first waveguide sub-channel group are connected to the end of the main waveguide channel 61 away from the main transmission port; the third waveguide sub-channel group is closest to the second waveguide feed structure 5, and ends of the eight waveguide sub-channels 623 serve as the transmission sub-ports mentioned above, and are provided in correspondence with eight second waveguide feed structures 5. FIG. 13*a* only schematically shows structures of the main waveguide channel 61 and the waveguide sub-channels inside the waveguide channel structure 6.

In some examples, for any two adjacent waveguide sub-channel groups connected, an extending direction in which each of the waveguide sub-channels in one waveguide sub-channel group extends is perpendicular to an extending direction in which each of the waveguide sub-channels in the other waveguide sub-channel group extends. For example, as shown in FIG. 13*a*, for the first waveguide sub-channel group and the second waveguide sub-channel group connected, the extending direction in which each waveguide sub-channel 621 of the first waveguide sub-channel group extends and the extending direction in which each waveguide sub-channel 622 of the second waveguide sub-channel group extends are perpendicular to each other; for the second waveguide sub-channel group and the third waveguide sub-channel group connected, the extending direction in which each waveguide sub-channel 622 in the second waveguide sub-channel group extends and the extending direction in which each waveguide sub-channel 623 in the third waveguide sub-channel group extends are perpendicular to each other.

It should be noted that, as shown in FIG. 4*a*, the main waveguide channel 61 and each waveguide sub-channel in the waveguide channel structure 6 each extend in a plane parallel to a plane where the substrate of the phase shifter unit 200 is located, and the cavity of the second waveguide feed structure 5 extends in a direction perpendicular to the plane.

In some examples, at least a part of at least one waveguide sub-channel in at least one waveguide sub-channel group is curved, which can extend the transmission path of the radio frequency signal, thereby facilitates to a miniaturization of a size of a waveguide and reducing a loss. Certainly, in practical applications, the main waveguide channel 61 may also be curved.

Figure 13B:
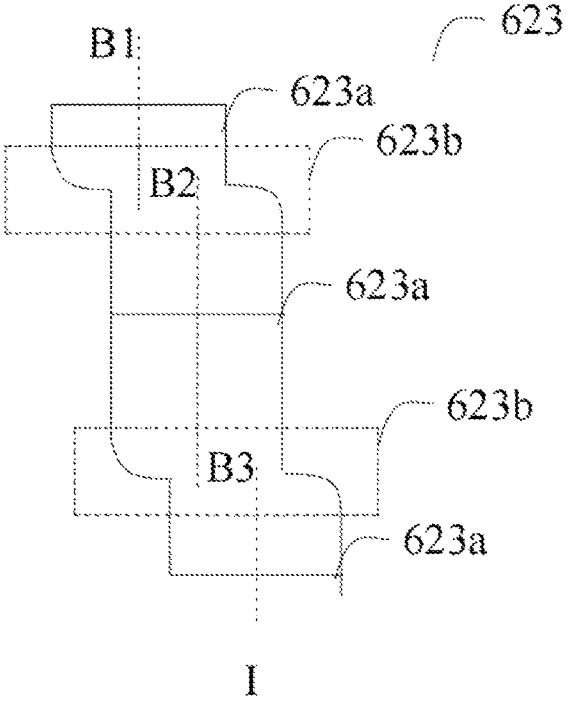
FIG. 13*b* is an enlarged view of a portion of a waveguide sub-channel in a region I of FIG. 13*a*.
Figure 14:
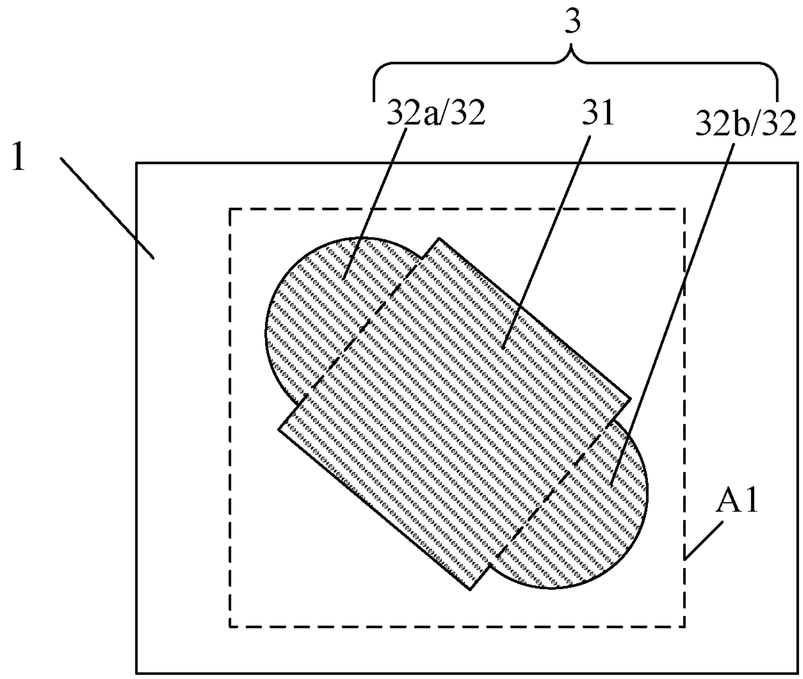
FIG. 14 is a schematic diagram (top view) of an exemplary structure of a waveguide radiation unit according to the present disclosure.

The waveguide sub-channel curved may, for example, include at least two straight channel segments, axes of any two adjacent straight channel segments in extending directions in which the two adjacent straight channel segments extend are parallel to each other, and a bent channel segment is connected between any two adjacent straight channel segments. For example, FIG. 13*b* is an enlarged view of a portion of the waveguide sub-channel in a region I of FIG. 13*a*. Referring to FIG. 13*b*, by taking a channel structure constituted by two waveguide sub-channels 623 as an example, the channel structure includes three straight channel segments 623*a*, axes (B1, B2, and B3) of the three straight channel segments 623*a* in extending directions in which the three straight channel segments 623*a* extend are parallel to each other, and a bent channel segment 623*b* is connected between any two adjacent straight channel segments 623*a*. The bent channel segment 623*b* is configured to realize a transition between the two adjacent straight channel segments 623*a*, and meanwhile, can extend a total path of the channel structure. Certainly, in practical applications, the waveguide sub-channel curved may have any other structure, as long as the path of the waveguide sub-channel is extended.

In some examples, the main waveguide channel 61 includes a plurality of main channel segments with different calibers and connected in sequence, and the closer to the main transmission port, the smaller the caliber of the main channel segment is. For example, as shown in FIG. 13*a*, the main channel includes two main channel segments, and the caliber of the main channel segment close to the main transmission port is less than that of the main channel segment away from the main transmission port.

In the phased array antenna provided by the present disclosure, the radiation patch 3 may have various structures, and a shape and a size of the radiation patch 3 each may be implemented in various implementations, as long as a resonant frequency of the radiation patch 3 can be ensured to be within an operating frequency band of the antenna. The following describes a structure of the radiation patch 3 in implementations.

In some examples, referring to FIGS. 14 to 19, the radiation patch 3 includes a first patch 31 and a second patch 32 connected and disposed in a same layer. The first patch 31 is configured to decompose the linear polarized radiation signal transmitted by the first transmission port P1 of the first waveguide feed structure 2 into a first linear polarized sub-signal and a second linear polarized sub-signal that are orthogonal to each other without any phase difference. The polarization direction of the linear polarized radiation signal is E1, the polarization direction of the first linear polarized sub-signal is E11, and the polarization direction of the second linear polarized sub-signal is E12. The second patch 32 is configured to cause the first linear polarized sub-signal and the second linear polarized sub-signal to form a circular polarized radiation signal, in other words, the second patch 32 is configured to cause a phase difference between the first linear polarized sub-signal and the second linear polarized sub-signal to be 90° or 270°.

It should be noted that, the first linear polarized sub-signal and the second linear polarized sub-signal are components, perpendicular to each other, obtained by decomposing the linear polarized radiation signal, and therefore amplitudes of the first linear polarized sub-signal and the second linear polarized sub-signal are the same, and in such case, if the phase difference between the first linear polarized sub-signal and the second linear polarized sub-signal is 90° or 270°, a circular polarized radiation signal can be formed by the first linear polarized sub-signal and the second linear polarized sub-signal.

In some examples, with continued reference to FIGS. 14 to 19, a shape of the first patch 31 of the radiation patch 3 may be a center symmetric pattern, and the second patch 32 of the radiation patch 3 may include a first sub-patch 32*a* and a second sub-patch 32*b*. The first sub-patch 32*a* and the second sub-patch 32*b* are symmetrically disposed with respect to a symmetry center (e.g., denoted by O1 in the figure) of the first patch 31, and shapes of the first sub-patch 32*a* and the second sub-patch 32*b* may be the same. The shape of the first patch 31 of the radiation patch 3 may adopt various types of center symmetric patterns, such as square, rectangle, circle, diamond, or the like, without limitation. The shapes of the first sub-patch 32*a* and the second sub-patch 32*b* may include various types of shapes such as square, rectangle, oval, circle, diamond, triangle, or the like, without limitation.

Figure 15:
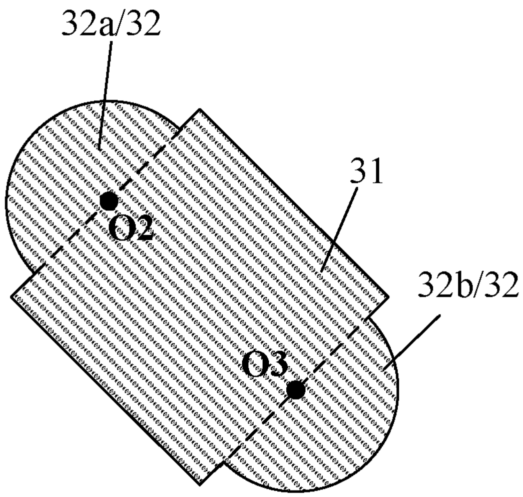
FIG. 15 is a schematic diagram of an exemplary structure of a radiation patch according to the present disclosure.
Figure 16:
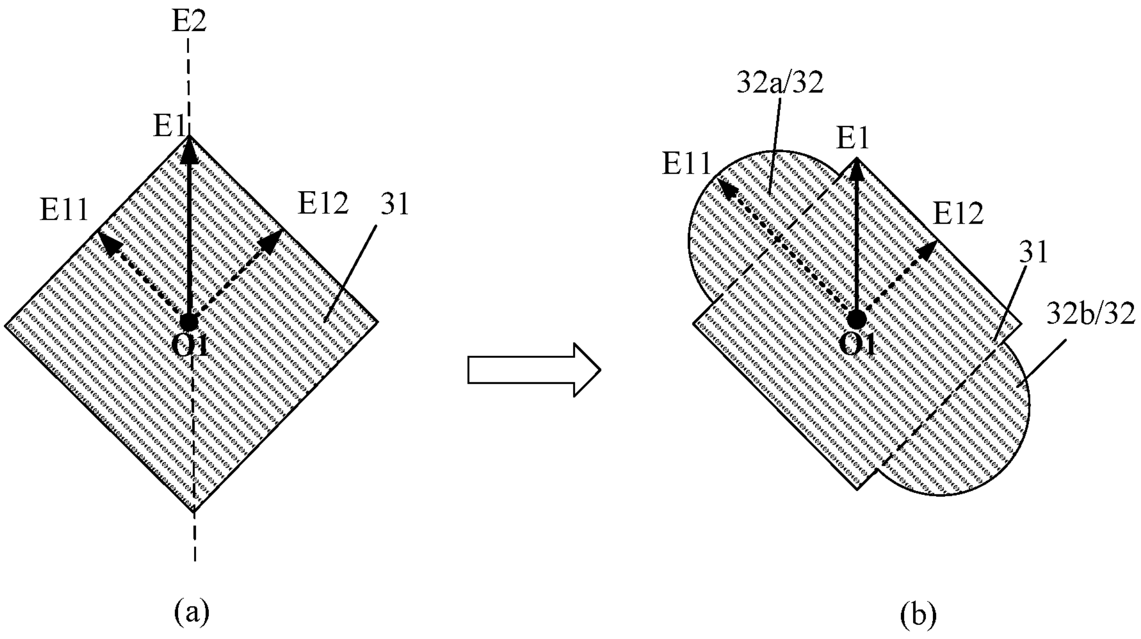
FIG. 16 is a schematic diagram illustrating a principle of circular polarization of a radiation patch according to the present disclosure.

In some examples, referring to FIGS. 14 to 17, the first patch 31 has a shape of square, and an extending direction E2 in which a diagonal of the first patch 31 extends is substantially parallel to the polarization direction E1 of the linear polarized radiation signal transmitted by the first transmission port P1 of the first waveguide feed structure 2, in other words, an included angle between the extending direction E2 in which the diagonal of the first patch 31 extends and the polarization direction E1 of the linear polarized radiation signal transmitted by the first transmission port P1 of the first waveguide feed structure 2 is substantially 0°, so that, referring to FIG. 16(*a*), the first patch 31 in the shape of square can decompose the linear polarized radiation signal with the polarization direction E1 into the first linear polarized sub-signal with the polarization direction E11 and the second linear polarized sub-signal with the polarization direction E12, and the first linear polarized sub-signal and the second linear polarized sub-signal are orthogonal to each other without any phase difference. The first patch 31 in the shape of square has four sides connected, including a first side and a second side disposed opposite to each other, and a third side and a fourth side disposed opposite to each other, the first sub-patch 32*a* is connected to the first side of the first patch 31, and the second sub-patch 32*b* is connected to the second side of the first patch 31, in other words, the first sub-patch 32*a* and the second sub-patch 32*b* are disposed opposite to each other with respect to the first patch 31, referring to FIG. 16(*b*), by connecting the first sub-patch 32*a* or the second sub-patch 32*b* to the first patch 31 in the shape of square, a phase of one of the first linear polarized sub-signal having the polarization direction E11 and the second linear polarized sub-signal having the polarization direction E12 can be changed, here, taking the phase of the first linear polarized sub-signal having the polarization direction E11 being changed as an example, the phase difference between the first linear polarized sub-signal having the polarization direction E11 and the second polarized sub-signal having the polarization direction E12 is 90° or 270°, so that the first linear polarized sub-signal with the polarization direction E11 and the second linear polarized sub-signal with the polarization direction E12 can form a circular polarized radiation signal.

Figure 17:
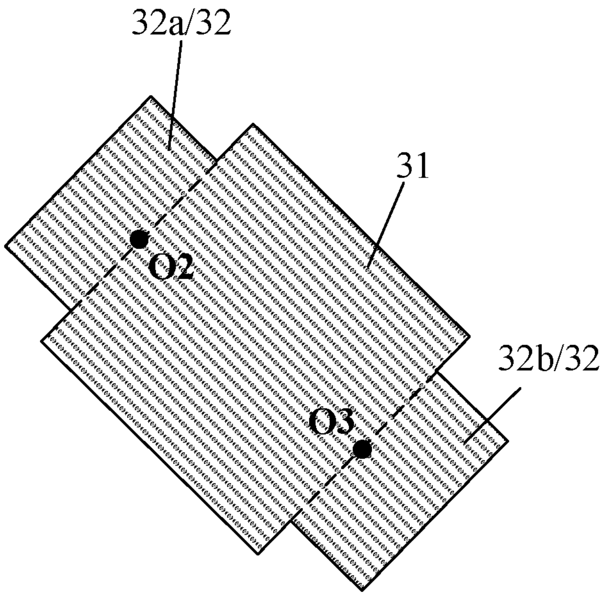
FIG. 17 is a schematic diagram of an exemplary structure of a radiation patch according to the present disclosure.

In some examples, referring to FIGS. 15 and 17, the first sub-patch 32*a* is connected to the first side of the first patch 31, and a side of the first sub-patch 32*a* connected to the first side may have a length less than a length of the first side, that is, the length of the side of the first sub-patch 32*a* may be less than the length of the side of the first patch 31, and in some examples, a midpoint of the side of the first sub-patch 32*a* connected to the first side of the first patch 31 coincides with a midpoint of the first side of the first patch 31 (e.g., denoted by O2 in the figure). The second sub-patch 32*b* is connected to the second side of the first patch 31, and a side of the second sub-patch 32*b* connected to the second side may have a length less than a length of the second side, that is, the length of the side of the second sub-patch 32*b* may be less than the length of the side of the first patch 31, and in some examples, a midpoint of the side of the second sub-patch 32*b* connected to the second side of the first patch 31 coincides with a midpoint of the second side of the first patch 31 (e.g., denoted by O3 in the figure).

In some examples, shapes of the first sub-patch 32*a* and the second sub-patch 32*b* may include various types of shapes, for example, referring to FIG. 15, each of the shapes of the first sub-patch 32*a* and the second sub-patch 32*b* may be semi-circular, and in such case, the first sub-patch 32*a* has a side in a shape of arc and a side serving as a diameter, the first sub-patch 32*a* is connected to the first side of the first patch 31 through the side serving as the diameter, and similarly, the second sub-patch 32*b* has a side in a shape of arc and a side serving as a diameter, the second sub-patch 32*b* is connected to the second side of the first patch 31 through the side serving as the diameter. For another example, referring to FIG. 17, the first sub-patch 32*a* and the second sub-patch 32*b* may be rectangular in shape, and in such case, the first sub-patch 32*a* has four sides, and is connected to the first side of the first patch 31 through any side thereof, and similarly, the second sub-patch 32*b* has four sides, and is connected to the second side of the first patch 31 through any side thereof. In FIG. 17, taking each of the shapes of the first sub-patch 32*a* and the second sub-patch 32*b* being rectangular as an example, the first sub-patch 32*a* is connected to the first side of the first patch 31 by a long side thereof, and the second sub-patch 32*b* is connected to the second side of the first patch 31 by a long side thereof.

Figure 18:
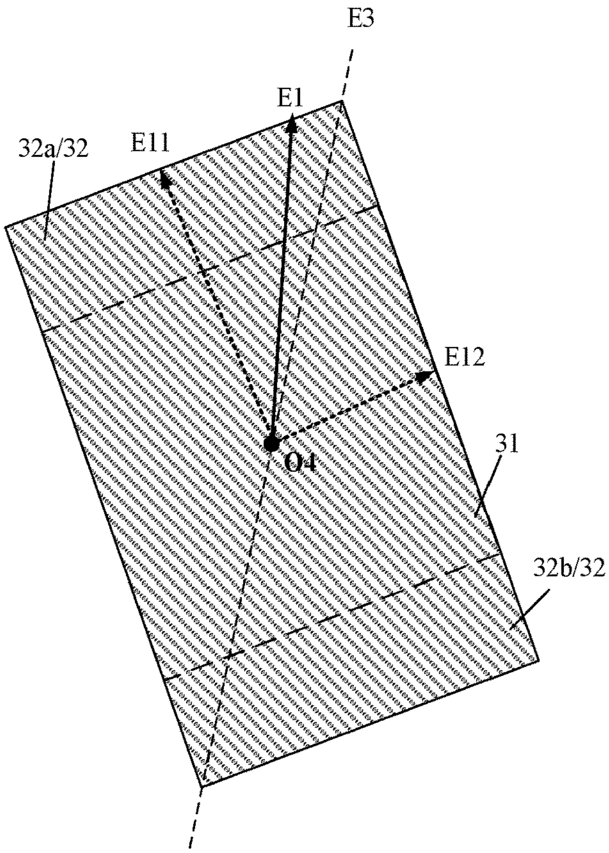
FIG. 18 is a schematic diagram of an exemplary structure of a radiation patch according to the present disclosure.

In some examples, referring to FIG. 18, the first patch 31, the first sub-patch 32*a*, and the second sub-patch 32*b* each may be rectangular, the first patch 31, the first sub-patch 32*a*, and the second sub-patch 32*b* are connected to form the radiation patch 3 being rectangular, and in particular, the first patch 31, the first sub-patch 32*a*, and the second sub-patch 32*b* each may be rectangular, each of long sides of the first sub-patch 32*a* and the second sub-patch 32*b* is equal to a short side of the first patch 31, the first sub-patch 32*a* is connected to the short side (i.e., the first side) of the first patch 31 through the long side thereof, and the second sub-patch 32*b* is connected to the short side (i.e., the second side) of the first patch 31 through the long side thereof, so that the first patch 31, the first sub-patch 32*a*, and the second sub-patch 32*b* are connected to form a regular rectangle. An included angle between the extending direction E3 of a diagonal of the radiation patch 3 being rectangular and the polarization direction of the linear polarized radiation signal transmitted by the first transmission port P1 of the first waveguide feed structure 2 ranges from 0° to 45°, and in particular, the included angle may be adjusted according to a length of each side of the radiation patch 3 being rectangular, as long as the first linear polarized sub-signal with the polarization direction E11 and the second linear polarized sub-signal with the polarization direction E12, that are orthogonal to each other, can be obtained, and a phase difference between the first linear polarized sub-signal with the polarization direction E11 and the second linear polarized sub-signal with the polarization direction E12 is 90° or 270°, which is not limited herein.

Figure 19:
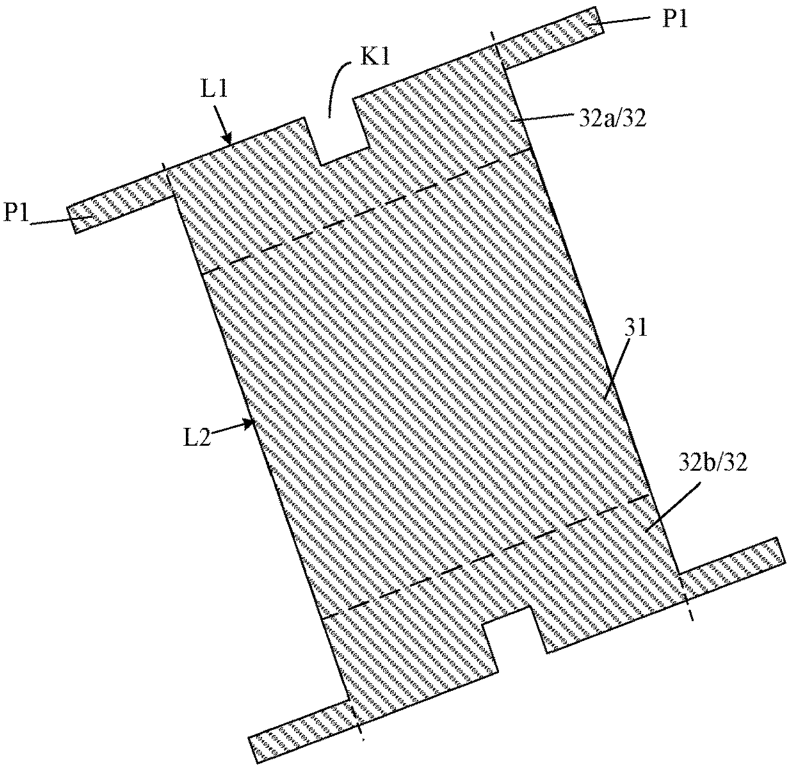
FIG. 19 is a schematic diagram of an exemplary structure of a radiation patch according to the present disclosure.

In some examples, a protrusion or a notch or the like may be provided on the radiation patch 3 to realize circular polarization of the radiation signal. Referring to FIG. 19, taking each of the first patch 31, the first sub-patch 32*a*, and the second sub-patch 32*b* being rectangular, and the first patch 31, the first sub-patch 32*a*, and the second sub-patch 32*b* are connected to form the radiation patch 3 being rectangular as an example, two short sides of the radiation patch 3 being rectangular are respectively provided with a notch K1, and a position of the notch K1 may be at a midpoint of each of the short sides. In some examples, a protrusion may be provided on the radiation patch 3, for example, both ends of each short side of the radiation patch 3 are respectively provided with the protrusion P1, and an extending direction in which each protrusion P1 extends may be the same as an extending direction in which each short side of the radiation patch 3 extends, which is not limited herein.

Certainly, the radiation patch 3 may be implemented in more implementations, for example, any corner of the radiation patch 3 being rectangular may be cut off, so that the first linear polarized sub-signal with the polarization direction E11 and the second linear polarized sub-signal with the polarization direction E12 are orthogonal to each other, and a phase difference between the first linear polarized sub-signal with the polarization direction E11 and the second linear polarized sub-signal with the polarization direction E12 is 90° or 270°, which is not limited herein.

In some examples, the dielectric substrate 1 includes any one of a glass substrate, a quartz substrate, a Teflon glass fiber press plate, a phenol paper unit press plate, a phenol glass cloth unit press plate, a foam substrate, a Printed Circuit Board (PCB), or the like. A thickness of the dielectric substrate ranges from 10 micrometers to 10 millimeters.

In some examples, a material of the radiation patch 3 includes at least one of metals such as aluminum, silver, gold, chromium, molybdenum, nickel, or iron.

Figure 20:
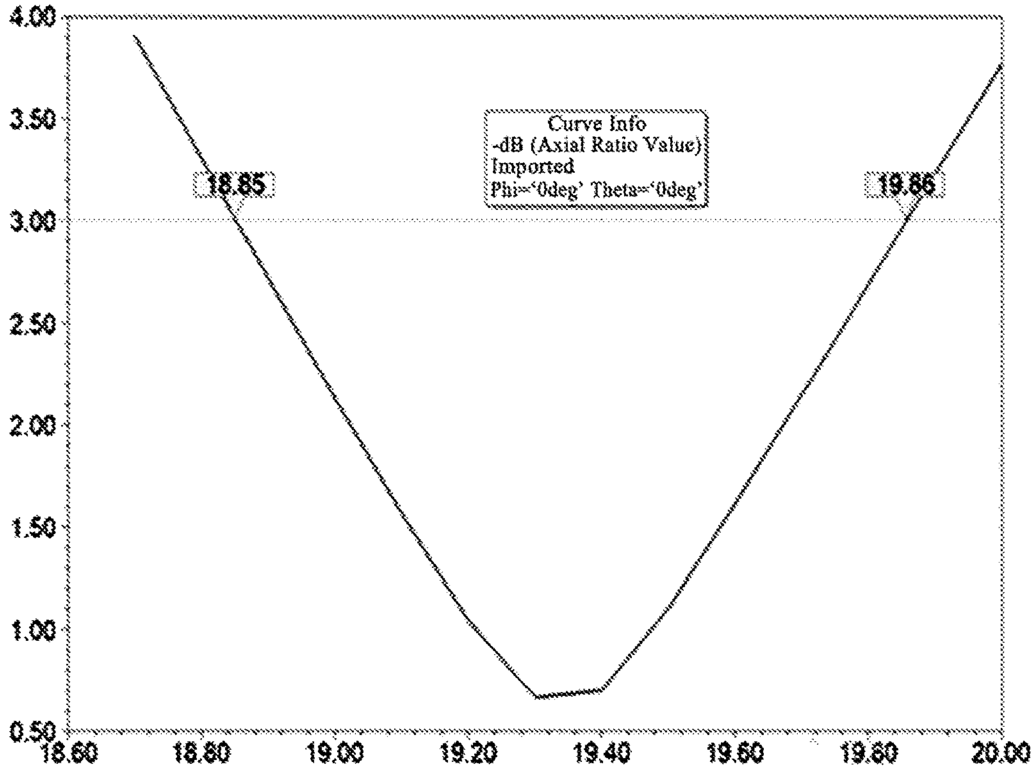
FIG. 20 is a simulated waveform diagram (with an axial ratio equal to 1) of a phased array antenna according to the present disclosure.
Figure 21:
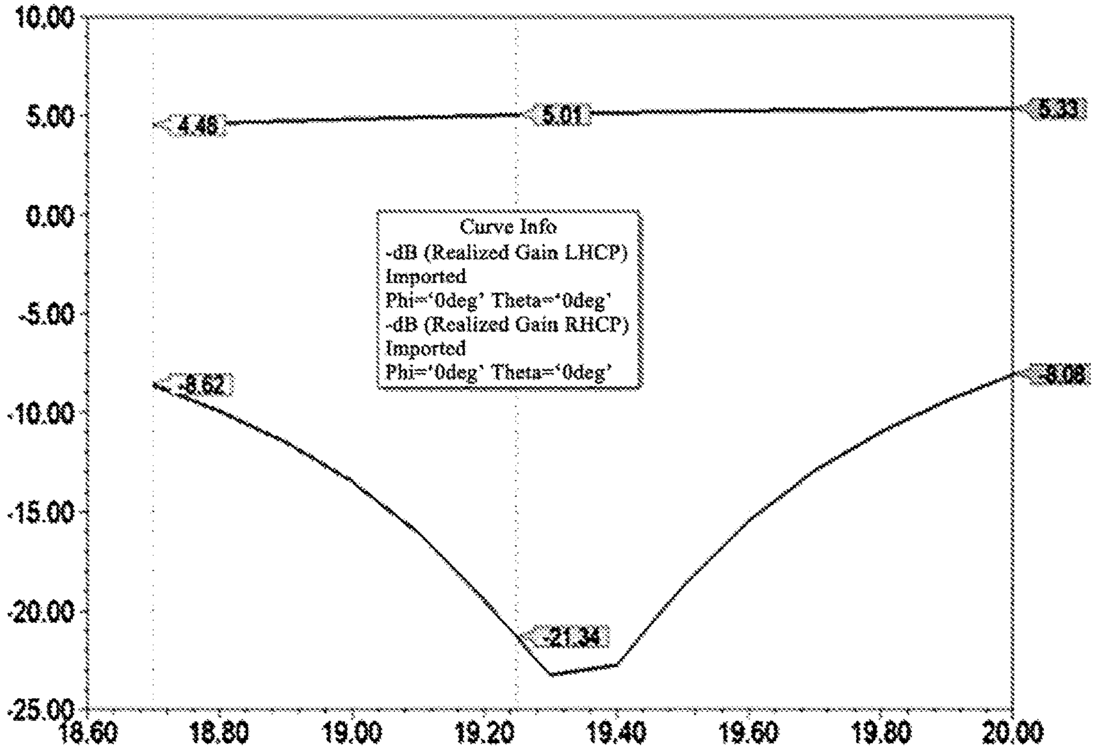
FIG. 21 is a simulated waveform diagram (gain) of a phased array antenna according to the present disclosure.
Figure 22:
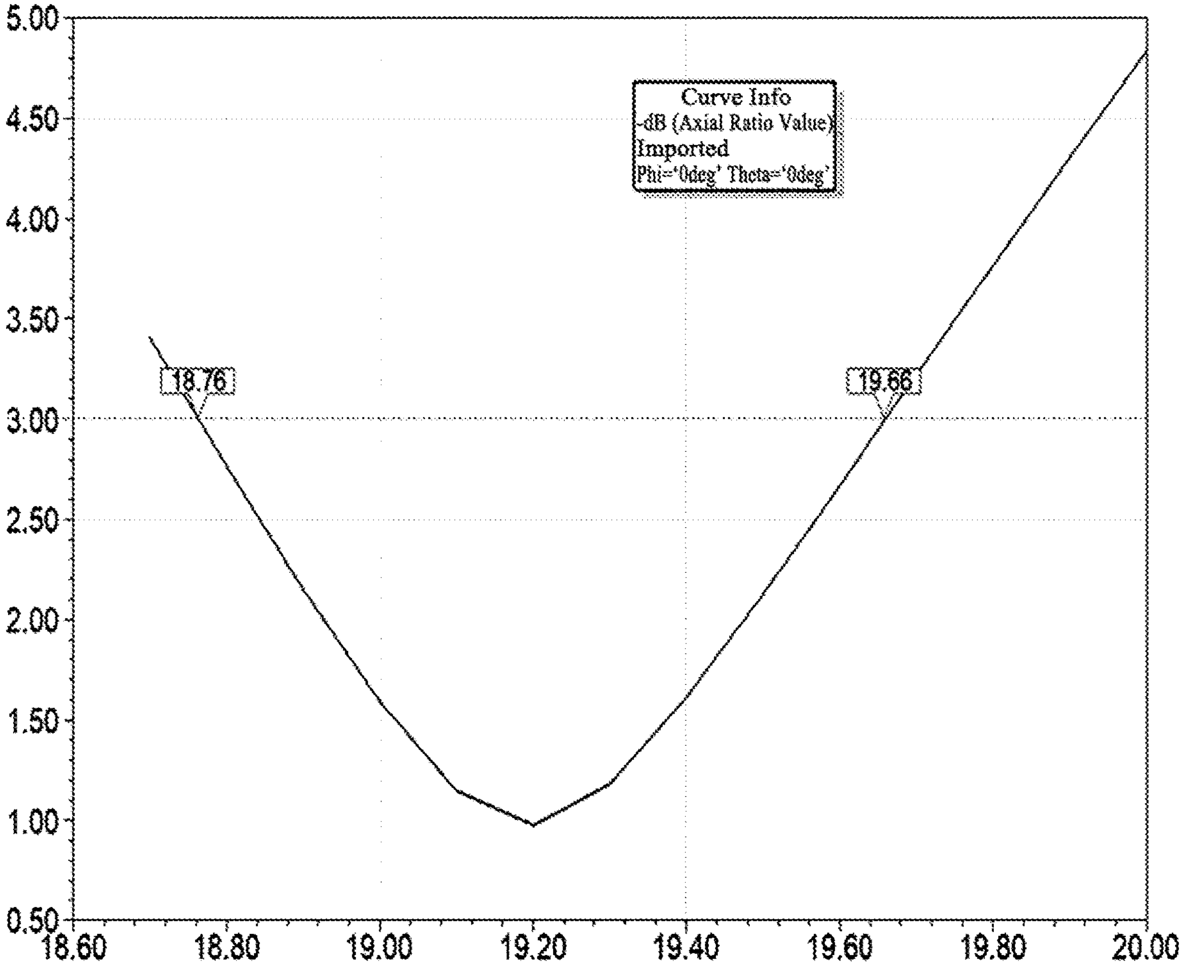
FIG. 22 is a simulated waveform diagram (with an axial ratio equal to 2) of a phased array antenna according to the present disclosure.

Referring to FIGS. 20 and 21, a simulation is performed using the phased array antenna provided by the present disclosure, and parameters for the simulation of the phased array antenna are as follows: a thickness of the radiation patch 3 is about 2 μm, the dielectric substrate is made of glass and has a thickness of about 0.5 mm, the first waveguide feed structure 2 has the structure as shown in FIG. 9, and includes the ridge waveguide structure 21 with the rectangular waveguide cavity and the feed-out waveguide structure 22 with the rectangular waveguide cavity, the ridge waveguide structure 21 has an outer diameter of about 8.5 mm×8.5 mm and an inner diameter (i.e., the caliber of the waveguide cavity) of about 6.5 mm×6.5 mm, and the caliber of the waveguide cavity of the feed-out waveguide structure 22 is about 4.5 mm×4.5 mm. FIG. 20 is an axial ratio simulation waveform diagram of the phased array antenna, and FIG. 21 is a gain simulation waveform diagram of the phased array antenna. FIG. 22 shows a simulation waveform diagram of the phased array antenna with the feed-out waveguide structure 22 being replaced by the circular waveguide cavity. As can be seen from above simulation waveform diagrams, the phased array antenna according to the present disclosure has a good axial ratio and a good gain.

Figure 23A:
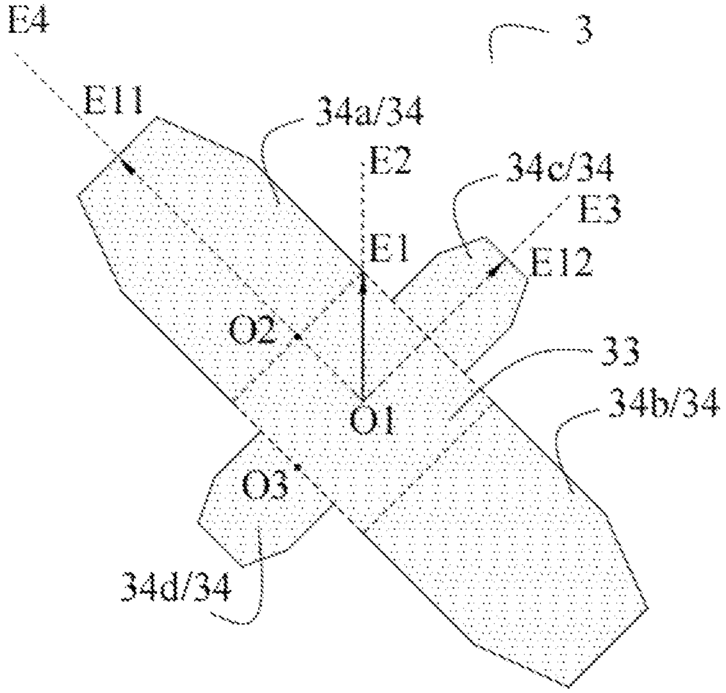
FIG. 23*a* is a schematic diagram of an exemplary structure of a radiation patch according to the present disclosure.
Figure 23B:
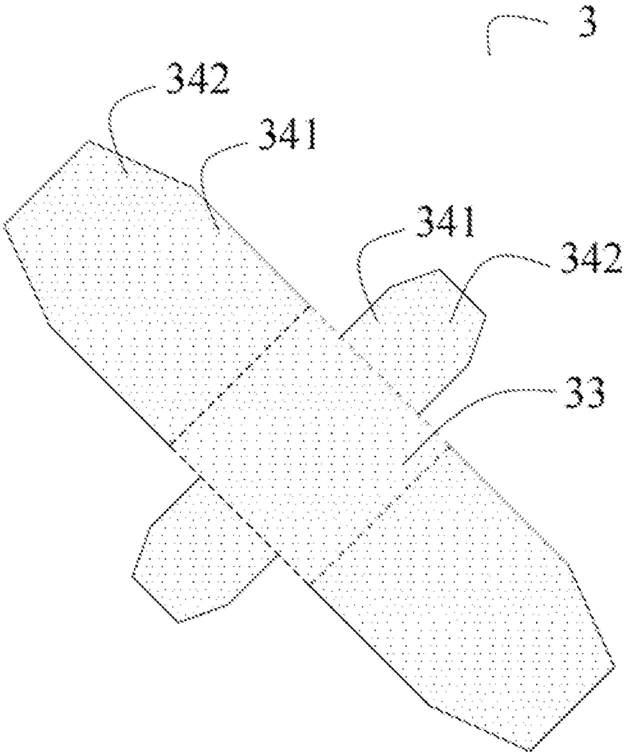
FIG. 23*b* is a schematic diagram (dimensional diagram) of an exemplary structure of a radiation patch according to the present disclosure.

FIG. 23*a* is a schematic diagram of an exemplary structure of a radiation patch provided by the present disclosure. FIG. 23*b* is a schematic diagram (dimensional diagram) of an exemplary structure of a radiation patch provided by the present disclosure. Referring to FIGS. 23*a* and 23*b*, in some examples, the radiation patch 3 includes a first patch 33 and a second patch 34 connected to each other and arranged in a same layer. The first patch 33 is configured to decompose the linear polarized radiation signal transmitted by the first transmission port P1 of the first waveguide feed structure 2 into a first linear polarized sub-signal and a second linear polarized sub-signal that are orthogonal to each other without any phase difference. The polarization direction of the linear polarized radiation signal is E1, the polarization direction of the first linear polarized sub-signal is E11, and the polarization direction of the second linear polarized sub-signal is E12. The second patch 34 is configured to cause the first linear polarized sub-signal and the second linear polarized sub-signal to form a circular polarized radiation signal, in other words, the second patch 34 is configured to cause the phase difference between the first linear polarized sub-signal and the second linear polarized sub-signal to be 90° or 270°.

In some examples, referring to FIGS. 23*a* and 23*b*, a shape of the first patch 33 of the radiation patch 3 may be a center symmetric pattern, and the second patch 34 of the radiation patch 3 may include a first sub-patch 34*a*, a second sub-patch 34*b*, a third sub-patch 34*c*, and a fourth sub-patch 34 *d*. The first sub-patch 34*a* and the second sub-patch 34*b* are symmetrically arranged with respect to a first symmetry axis E3 of the first patch 33; the third sub-patch 34*c* and the fourth sub-patch 34*d* are arranged symmetrically with respect to a second symmetry axis E4 of the first patch 33; the first symmetry axis E3 is relatively perpendicular to the second symmetry axis E4.

Shapes of the first sub-patch 34*a* and the second sub-patch 34*b* may be the same with each other; and shapes of the third sub-patch 34*c* and the fourth sub-patch 34*d* may be the same with each other. The shape of the first patch 33 of the radiation patch 3 may adopt various types of center symmetric patterns, such as a square, a rectangle, a circle, a diamond, and the like, without limitation. The shapes of the first sub-patch 34*a*, the second sub-patch 34*b*, the third sub-patch 34*c*, and the fourth sub-patch 34*d* may include various types of shapes such as a square, a rectangle, an oval, a circle, a diamond, a triangle, or the like, without limitation.

In some examples, referring to FIGS. 23*a* and 23*b*, the first patch 33 is square in shape, and the extending direction E2 in which a diagonal of the first patch 33 extends is substantially parallel to the polarization direction E1 of the linear polarized radiation signal transmitted by the first transmission port P1 of the first waveguide feed structure 2, in other words, an included angle between the extending direction E2 in which the diagonal of the first patch 33 extends and the polarization direction E1 of the linear polarized radiation signal transmitted by the first transmission port P1 of the first waveguide feed structure 2 is substantially 0°, so that the first patch 33 being square in shape can decompose the linear polarized radiation signal with the polarization direction E1 into the first linear polarized sub-signal with the polarization direction E11 and the second linear polarized sub-signal with the polarization direction E12, that are orthogonal to each other without any phase difference. The first patch 33 being square in shape has four connected sides, including a first side and a second side opposite to each other, and a third side and a fourth side opposite to each other, the first sub-patch 34*a* is connected to the first side of the first patch 33, the second sub-patch 34*b* is connected to the second side of the first patch 33, the third sub-patch 34*c* is connected to the third side of the first patch 33, and the fourth sub-patch 34*d* is connected to the fourth side of the first patch 33, in other words, the first sub-patch 34*a* and the second sub-patch 34*b* are arranged opposite to each other, and the third sub-patch 34*c* and the fourth sub-patch 34*d* are arranged opposite to each other.

By connecting the first sub-patch 34*a* and the second sub-patch 34*b* to the first patch 33 being square in shape, the phase of the first linear polarized sub-signal with the polarization direction E11 can be changed; and by connecting the third sub-patch 34*c* and the fourth sub-patch 34*d* to the first patch 33 being square in shape, the phase of the second linear polarized sub-signal with the polarization direction E12 can be changed, so that the phase difference between the first linear polarized sub-signal with the polarization direction E11 and the second linear polarized sub-signal with the polarization direction E12 is 90° or 270°, and thus the first linear polarized sub-signal with the polarization direction E11 and the second linear polarized sub-signal with the polarization direction E12 can form a circular polarized radiation signal.

In some examples, a side of the first sub-patch 34*a* connected to the first side of the first patch 33 has a length greater than that of a side of the third sub-patch 34*c* connected to the third side of the first patch 33, that is, a width of the first sub-patch 34*a* on the first symmetry axis E3 is greater than a width of the third sub-patch 34*c* on the second symmetry axis E4; a length of the first sub-patch 34*a* in a direction perpendicular to the first symmetry axis E3 is greater than a length of the third sub-patch 34*c* in a direction perpendicular to the second symmetry axis E4. In this way, an area of an orthographic projection of the radiation patch 3 on the dielectric substrate 1 can be reduced, and shielding for the first transmission port P1 of the first waveguide feed structure 2 is reduced, which facilitates to reducing a return loss.

In some examples, the side of the first sub-patch 34*a* connected to the first side of the first patch 33 has a length less than or equal to the length of the first side of the first patch 33, and a midpoint of the side of the first sub-patch 34*a* connected to the first side of the first patch 33 coincides with a midpoint of the first side of the first patch 33 (e.g., denoted by O2 in FIG. 23*a*); the length of the side of the second sub-patch 34*b* connected with the second side of the first patch 33 is less than or equal to the length of the second side of the first patch 33, and a midpoint of the side of the second sub-patch 34*b* connected with the second side of the first patch 33 coincides with a midpoint of the second side of the first patch 33; the side of the third sub-patch 34*c* connected to the third side of the first patch 33 has a length less than the length of the third side of the first patch 33, and a midpoint of the side of the third sub-patch 34*c* connected to the third side of the first patch 33 coincides with a midpoint of the third side of the first patch 33 (e.g., denoted by O3 in FIG. 23*a*); the length of the side of the fourth sub-patch 34*d* connected to the fourth side of the first patch 33 is less than the length of the fourth side of the first patch 33, and a midpoint of the side of the fourth sub-patch 34*d* connected to the fourth side of the first patch 33 coincides with a midpoint of the fourth side of the first patch 33.

In some examples, the shapes of the first sub-patch 32*a* and the second sub-patch 32*b* may include various types of shapes, for example, referring to FIG. 23*b*, each of the first sub-patch 34*a*, the second sub-patch 34*b*, the third sub-patch 34*c*, and the fourth sub-patch 34*d* includes a rectangular part 341 and a trapezoidal part 342 that are connected, a side of the rectangular part 341 is connected with a corresponding side of the first patch 33; a long bottom edge of the trapezoidal part 342 is connected to the side of the rectangular part 341 away from the first patch 33, which can further reduce the area of the orthographic projection of the radiation patch 3 on the dielectric substrate 1, and reduce the shielding for the first transmission port P1 of the first waveguide feed structure 2, thereby facilitating to reducing the return loss. The trapezoid part 342 is, for example, an isosceles trapezoid.

In summary, the phased array antenna provided by the present disclosure can reduce a space occupied by the waveguide radiation unit and the waveguide power dividing unit, so as to reduce an overall thickness of the phased array antenna (not greater than 30 mm); meanwhile, the loss can be reduced, for example, a matching insertion loss between the phase shifter unit and the waveguide radiation unit is reduced, so that an overall insertion loss can be controlled within 1 dB.

It should be understood that the above implementations are merely exemplary implementations that are employed to illustrate the principle of the present disclosure, and are not to be construed as limiting the present disclosure. It will be apparent to those skilled in the art that various modifications and improvements may be made without departing from the spirit and scope of the present disclosure, and such modifications and improvements are considered to be within the scope of the present disclosure.

The invention claimed is:

1. A phased array antenna, comprising a waveguide radiation unit, a phase shifter unit and a waveguide power dividing unit, wherein the waveguide radiation unit comprises a dielectric substrate, and a radiation patch and a first waveguide feed structure respectively arranged on two opposite sides of the dielectric substrate, the radiation patch and the first waveguide feed structure are the same in number, and a first transmission port of each first waveguide feed structure is arranged corresponding to the radiation patch;

the phase shifter unit comprises a phase shifter, the phase shifter and the first waveguide feed structure are the same in number, and a first feed region of each phase shifter is arranged corresponding to a second transmission port of the first waveguide feed structure;

the waveguide power dividing unit comprises a plurality of second waveguide feed structures, and a first transmission port of each second waveguide feed structure corresponds to a second feed region of at least one phase shifter;

each of the first waveguide feed structure and the second waveguide feed structures comprises a ridge waveguide structure; the ridge waveguide structure has at least one sidewall, the at least one sidewall defines a waveguide cavity of the ridge waveguide structure, and at least one ridge protruding toward the waveguide cavity is provided on the at least one sidewall.

2. The phased array antenna of claim 1, wherein the ridge waveguide structure of each first waveguide feed structure has six connected sidewalls, comprising two first sidewalls opposite to each other, two second sidewalls opposite to each other, and two third sidewalls opposite to each other, wherein each of the third sidewalls is connected between one of the first sidewalls and one of the second sidewalls; each of the first sidewalls is connected between one of the second sidewalls and one of the third sidewalls;

the first sidewalls are perpendicular to a polarization direction of a linear polarized radiation signal, a first ridge and a second ridge are respectively arranged on the two first sidewalls, and the polarization direction of the linear polarized radiation signal is parallel to a connection line between the first ridge and the second ridge;

the two third sidewalls are arranged oppositely along a first direction, each of the third sidewalls is perpendicular to the first direction, the linear polarized radiation signal transmitted by the first transmission port is decomposed into a first linear polarized sub-signal and a second linear polarized sub-signal that are orthogonal to each other without any phase difference, and the first direction is a polarization direction of the first linear polarized sub-signal.

3. The phased array antenna of claim 2, wherein the waveguide power dividing unit further comprises a waveguide channel structure, the waveguide channel structure has a main transmission port and a plurality of transmission sub-ports, a number of the transmission sub-ports is the same as a number of second transmission ports of the second waveguide feed structures, and the transmission sub-ports are disposed corresponding to the second transmission ports of the second waveguide feed structures.

4. The phased array antenna of claim 2, wherein the radiation patch comprises a first patch and a second patch connected and disposed in a same layer; the first patch is configured to decompose a linear polarized radiation signal transmitted by the first transmission port into a first linear polarized sub-signal and a second linear polarized sub-signal that are orthogonal to each other without any phase difference; the second patch is configured to cause the first linear polarized sub-signal and the second linear polarized sub-signal to form a circular polarized radiation signal.

5. The phased array antenna of claim 1, wherein the ridge waveguide structure of each of the second waveguide feed structures has four connected sidewalls, comprising two fourth sidewalls opposite to each other and two fifth sidewalls opposite to each other, wherein, the fourth sidewalls are perpendicular to a polarization direction of a linear polarized radiation signal, a third ridge and a fourth ridge are arranged on the two fourth sidewalls respectively, and the polarization direction of the linear polarized radiation signal transmitted by the first transmission port is parallel to a connection line between the third ridge and the fourth ridge.

6. The phased array antenna of claim 5, wherein the waveguide power dividing unit further comprises a waveguide channel structure, the waveguide channel structure has a main transmission port and a plurality of transmission sub-ports, a number of the transmission sub-ports is the same as a number of second transmission ports of the second waveguide feed structures, and the transmission sub-ports are disposed corresponding to the second transmission ports of the second waveguide feed structures.

7. The phased array antenna of claim 5, wherein the radiation patch comprises a first patch and a second patch connected and disposed in a same layer; the first patch is configured to decompose a linear polarized radiation signal transmitted by the first transmission port into a first linear polarized sub-signal and a second linear polarized sub-signal that are orthogonal to each other without any phase difference; the second patch is configured to cause the first linear polarized sub-signal and the second linear polarized sub-signal to form a circular polarized radiation signal.

8. The phased array antenna of claims 1, wherein the waveguide power dividing unit further comprises a waveguide channel structure, the waveguide channel structure has a main transmission port and a plurality of transmission sub-ports, a number of the transmission sub-ports is the same as a number of second transmission ports of the second waveguide feed structures, and the transmission sub-ports are disposed corresponding to the second transmission ports of the second waveguide feed structures.

9. The phased array antenna of claim 8, wherein the waveguide channel structure comprises a main waveguide channel and a plurality of waveguide sub-channel groups, one port of the main waveguide channel serves as the main transmission port;

the waveguide sub-channel groups are connected in sequence along a direction from the main transmission port to the transmission sub-ports, and for any two adjacent waveguide sub-channel groups, a number of waveguide sub-channels in one waveguide sub-channel group closer to the transmission sub-ports is two times a number of waveguide sub-channels in the other waveguide sub-channel group, and an end of each waveguide sub-channel in the one waveguide sub-channel group closer to the transmission sub-port is correspondingly connected with ends of two waveguide sub-channels in the other waveguide sub-channel group;

two waveguide sub-channels are arranged in the waveguide sub-channel group closest to the main waveguide channel, and an end of each of the two waveguide sub-channels is connected with an end of the main waveguide channel away from the main transmission port; an end of each of the waveguide sub-channels in the waveguide sub-channel group closest to the second waveguide feed structures serves as the transmission sub-port.

10. The phased array antenna of claim 9, wherein, for any two adjacent waveguide sub-channel groups connected, an extending direction in which the waveguide sub-channels in one waveguide sub-channel group extend is perpendicular to an extending direction in which the waveguide sub-channels in the other waveguide sub-channel group extend.

11. The phased array antenna of claim 9, wherein at least a part of at least one waveguide sub-channel in at least one waveguide sub-channel group is curved.

12. The phased array antenna of claim 11, wherein each waveguide sub-channel of at least one waveguide sub-channel group comprises at least two straight channel segments, axes of any two adjacent straight channel segments in extending directions in which the two adjacent straight channel segments extend are parallel to each other, and a bent channel segment is connected between any two adjacent straight channel segments.

13. The phased array antenna of claim 9, wherein the main waveguide channel comprises a plurality of main channel segments with different calibers and connected in sequence, and the closer to the main transmission port, the smaller the caliber of the main channel segment is.

14. The phased array antenna of claim 8, wherein the waveguide power dividing unit further comprises connection waveguide structures, a number of the connection waveguide structures is the same as that of the second waveguide feed structures, and a first transmission port of each connection waveguide structure is arranged corresponding to the second feed region of at least one phase shifter; a second transmission port of each connection waveguide structure is arranged corresponding to the first transmission port of each second waveguide feed structure.

15. The phased array antenna of claims 1, wherein the radiation patch comprises a first patch and a second patch connected and disposed in a same layer; the first patch is configured to decompose a linear polarized radiation signal transmitted by the first transmission port into a first linear polarized sub-signal and a second linear polarized sub-signal that are orthogonal to each other without any phase difference; the second patch is configured to cause the first linear polarized sub-signal and the second linear polarized sub-signal to form a circular polarized radiation signal.

16. The phased array antenna of claim 15, wherein the first patch is in a shape of a center symmetric pattern; the second patch comprises a first sub-patch, a second sub-patch, a third sub-patch and a fourth sub-patch; the first sub-patch and the second sub-patch are symmetrically arranged with respect to a first symmetry axis of the first patch; the third sub-patch and the fourth sub-patch are symmetrically arranged with respect to a second symmetry axis of the first patch; the first symmetry axis is relatively perpendicular to the second symmetry axis.

17. The phased array antenna of claim 16, wherein the first patch is square in shape, and an extending direction in which a diagonal of the first patch extends is parallel to a polarization direction of the linear polarized radiation signal; the first sub-patch is connected to a first side of the first patch, the second sub-patch is connected to a second side of the first patch, and the first side is opposite to the second side; the third sub-patch is connected to a third side of the first patch, the fourth sub-patch is connected to a fourth side of the first patch, and the third side is opposite to the fourth side.

18. The phased array antenna of claim 17, wherein a side of the first sub-patch connected to the first side has a length greater than that of a side of the third sub-patch connected to the third side;

a length of the first sub-patch in a direction perpendicular to the first symmetry axis is larger than a length of the third sub-patch in a direction perpendicular to the second symmetry axis.

19. The phased array antenna of claim 17, wherein a side of the first sub-patch connected to the first side has a length less than or equal to that of a length of the first side, and a midpoint of the side of the first sub-patch connected to the first side coincides with a midpoint of the first side; a length of a side of the second sub-patch connected to the second side is less than or equal to a length of the second side, and a midpoint of the side of the second sub-patch connected to the second side coincides with a midpoint of the second side;

a length of a side of the third sub-patch connected to the third side is less than a length of the third side, and a midpoint of the side of the third sub-patch connected to the third side coincides with a midpoint of the third side; a length of a side of the fourth sub-patch connected to the fourth side is less than a length of the fourth side, and a midpoint of the side of the fourth sub-patch connected to the fourth side coincides with a midpoint of the fourth side.

20. The phased array antenna of claim 17, wherein each of the first sub-patch, the second sub-patch, the third sub-patch and the fourth sub-patch comprises a rectangular part and a trapezoidal part connected, a side of the rectangular part is connected to a corresponding side of the first patch; a long bottom edge of the trapezoidal part is connected to a side of the rectangular part away from the first patch.

* * * * *